(12) United States Patent
Kainuma

(10) Patent No.: US 10,718,907 B2
(45) Date of Patent: Jul. 21, 2020

(54) HOLDING MEMBER AND OPTICAL MODULE

(71) Applicant: FUJITSU LIMITED, Kawasaki-shi, Kanagawa (JP)

(72) Inventor: Norio Kainuma, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/262,377

(22) Filed: Jan. 30, 2019

(65) Prior Publication Data

US 2019/0258007 A1 Aug. 22, 2019

(30) Foreign Application Priority Data

Feb. 21, 2018 (JP) .................................. 2018-029062

(51) Int. Cl.
*G02B 6/30* (2006.01)
*G02B 6/36* (2006.01)
*G02B 6/42* (2006.01)
*G02B 6/38* (2006.01)

(52) U.S. Cl.
CPC ............. *G02B 6/30* (2013.01); *G02B 6/3644* (2013.01); *G02B 6/4239* (2013.01); *G02B 6/4249* (2013.01); *G02B 6/3885* (2013.01)

(58) Field of Classification Search
CPC ................................ G02B 6/30; G02B 6/4239
See application file for complete search history.

(56) References Cited

U.S. PATENT DOCUMENTS

| | | | |
|---|---|---|---|
| 6,394,666 B1 * | 5/2002 | Minamino | G02B 6/4231 385/90 |
| 6,419,401 B1 * | 7/2002 | Taira | G02B 6/381 385/55 |
| 2005/0151272 A1 * | 7/2005 | Street | H01L 27/14618 257/787 |

FOREIGN PATENT DOCUMENTS

| | | |
|---|---|---|
| JP | 06-167637 | 6/1994 |
| JP | 2003-043304 | 2/2003 |

* cited by examiner

*Primary Examiner* — Omar R Rojas
(74) *Attorney, Agent, or Firm* — Fujitsu Patent Center

(57) ABSTRACT

A holding member is configured to hold an optical fiber of which an end connects to an optical circuit formed on a semiconductor substrate, the holding member includes a first surface configured to surround an exposed end of the held optical fiber, a second surface configured to be bonded to the semiconductor substrate to surround the first surface, and a groove configured to be formed along an edge of the first surface and provided between the edge of the first surface and an edge of the second surface.

9 Claims, 23 Drawing Sheets

HOLDING MEMBER AND OPTICAL MODULE

CROSS-REFERENCE TO RELATED APPLICATION

This application is based upon and claims the benefit of priority of the prior Japanese Patent Application No. 2018-029062, filed on Feb. 21, 2018, the entire contents of which are incorporated herein by reference.

FIELD

The embodiments discussed herein are related to a holding member and an optical module.

BACKGROUND

In the related art, a configuration of an optical connector ferrule has been known, in which an adhesive outflow prevention unit is provided between a guide hole and a boots insertion hole to suppress an adhesive from being introduced into the guide hole (see, e.g., Japanese Laid-open Patent Publication No. 2003-043304). In addition, a configuration has been known, in which a groove is formed so as to suppress a fixing agent from protruding to the outside at the time of assembling a multi-core optical connector (see, e.g., Japanese Laid-open Patent Publication No. 06-167637).

Related techniques are disclosed in, for example, Japanese Laid-open Patent Publication Nos. 2003-043304 and 06-167637.

SUMMARY

According to an aspect of the embodiments, a holding member is configured to hold an optical fiber of which an end connects to an optical circuit formed on a semiconductor substrate, the holding member includes a first surface configured to surround an exposed end of the held optical fiber, a second surface configured to be bonded to the semiconductor substrate to surround the first surface, and a groove configured to be formed along an edge of the first surface and provided between the edge of the first surface and an edge of the second surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-described related art, when bonding an optical fiber holding member such as, for example, a ferrule to a semiconductor substrate such as, for example, a silicon photonics chip, it is impossible to suppress an adhesive before curing from unevenly protruding from the holding member. Therefore, the holding member may be pulled by the curing shrinkage of the adhesive unevenly protruding from the holding member, and the positional deviation of the holding member with respect to the semiconductor substrate may occur.

Hereinafter, embodiments of a technology capable of suppressing the positional deviation of a holding member due to curing shrinkage of an adhesive will be described in detail with reference to the accompanying drawings.

First Embodiment

Ferrule and Silicon Photonics Chip According to First Embodiment

Figure 1:
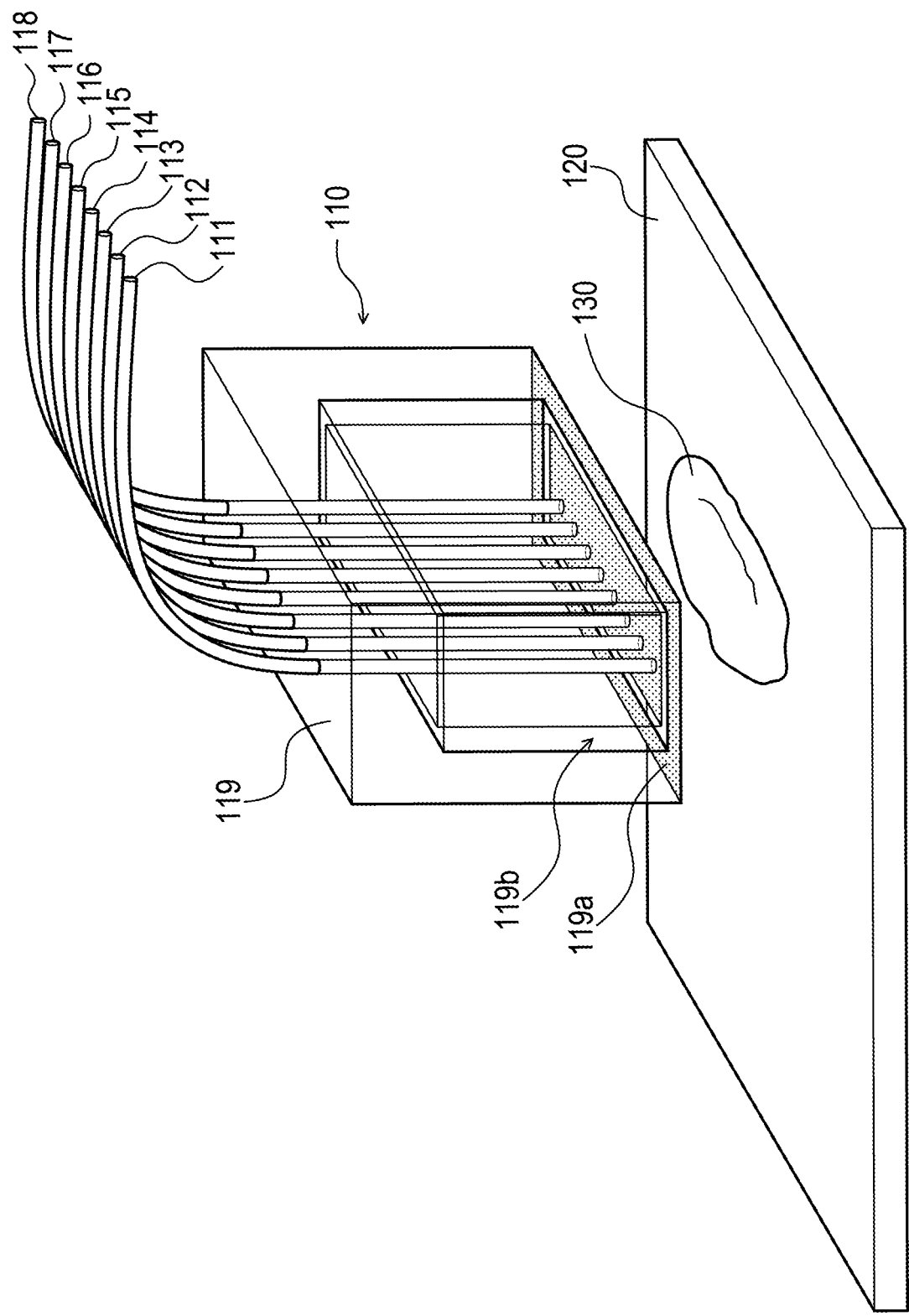
FIG. 1 is a perspective view illustrating an example of a ferrule and a silicon photonics chip according to a first embodiment.
Figure 2:
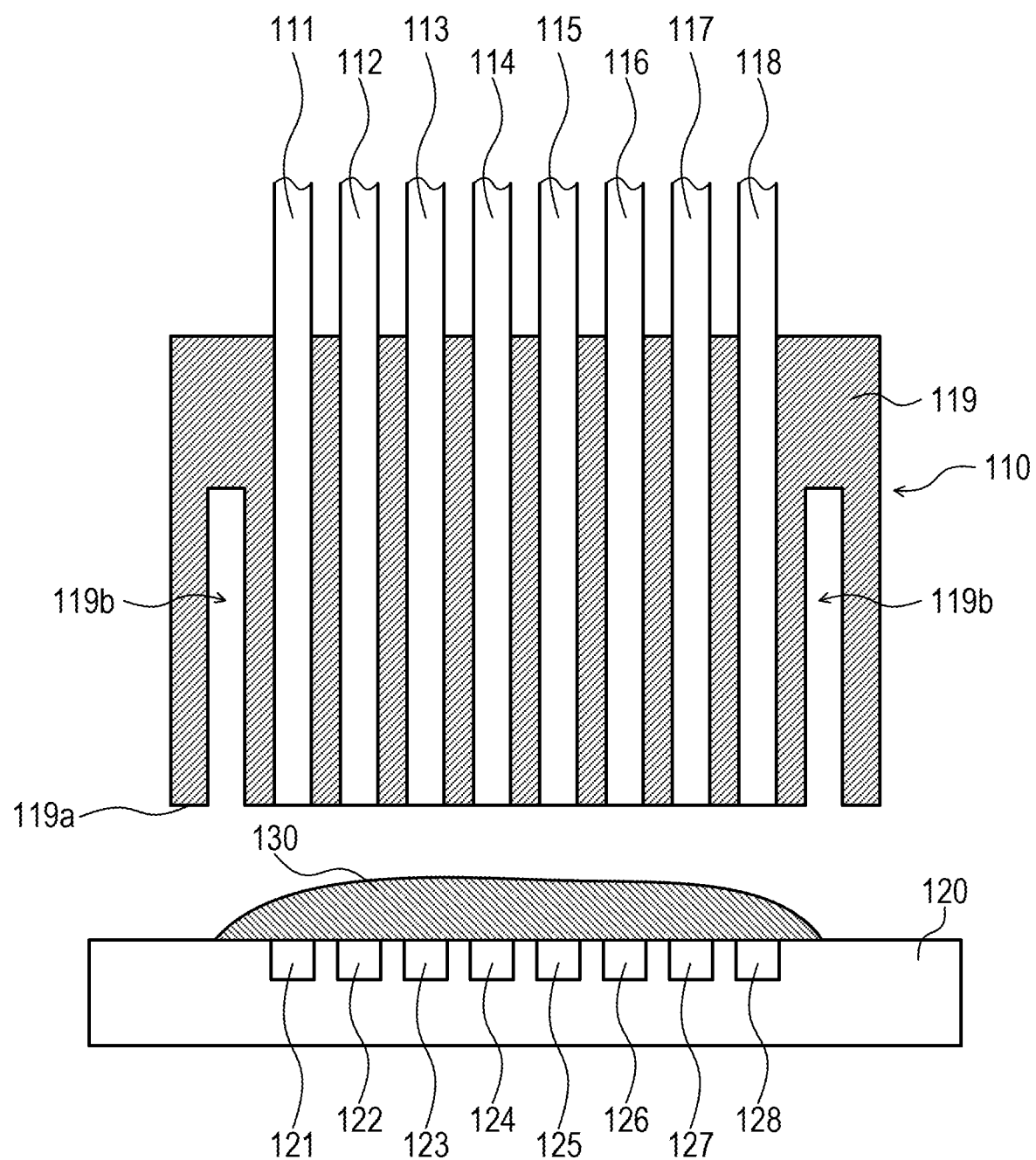
FIG. 2 is a cross-sectional view illustrating the example of the ferrule and the silicon photonics chip according to the first embodiment.
Figure 3:
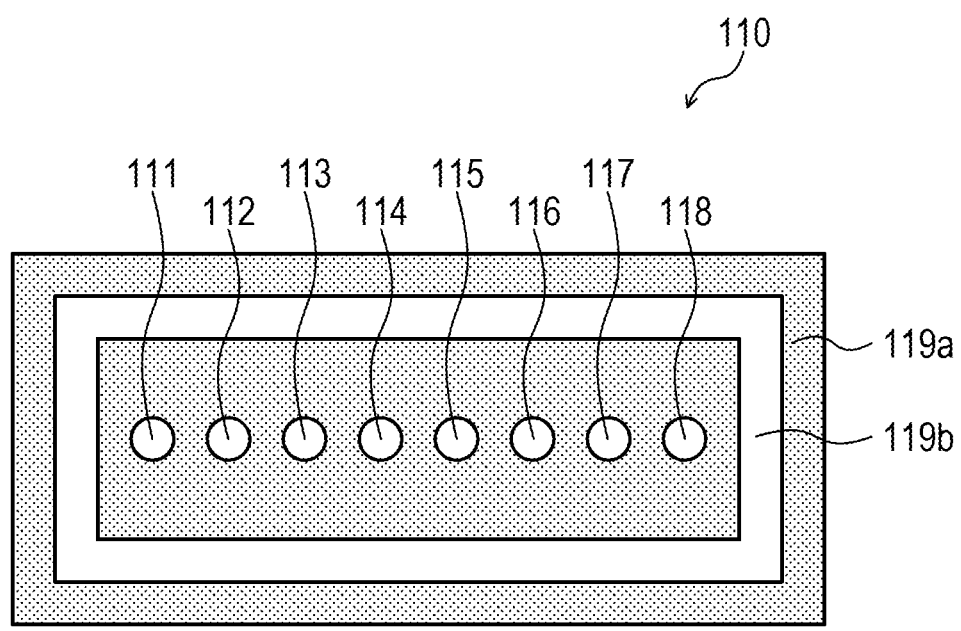
FIG. 3 is a bottom view illustrating the example of the ferrule according to the first embodiment.

FIG. 1 is a perspective view illustrating an example of a ferrule and a silicon photonics chip according to a first embodiment. FIG. 2 is a cross-sectional view illustrating the example of the ferrule and the silicon photonics chip according to the first embodiment. FIG. 3 is a bottom view illustrating the example of the ferrule according to the first embodiment. An optical fiber array 110 illustrated in FIGS. 1 to 3 is an optical transmission path which is connected to a silicon photonics chip 120. For example, the optical fiber array 110 includes optical fibers 111 to 118 and a ferrule 119.

The optical fibers 111 to 118 are eight optical fibers arranged in an array form. Each of the optical fibers 111 to 118 is a transmission path that transmits light, and is formed of, for example, quartz glass or plastic. However, for example, the number, arrangement, and material of the optical fibers are not limited thereto, and various modifications thereof are possible.

The ferrule 119 is a holding member which holds the vicinity of end portions of the optical fibers 111 to 118 and connects the end portions of the optical fibers 111 to 118 to an optical circuit formed on the silicon photonics chip 120. For example, the ferrule 119 has a lower surface 119a where the end portions of the held optical fibers 111 to 118 are exposed, and the lower surface 119a is bonded to the silicon photonics chip 120 by an adhesive 130. For example, the ferrule 119 is formed of a transparent member such as, for example, glass.

For example, the ferrule 119 has a shape in which a rectangular parallelepiped of 4 mm×3 mm×5 mm or of 5 mm×3 mm×5 mm is formed with, for example, a hole or a groove 119b to be described later which holds the optical fibers 111 to 118. However, the shape or size of the ferrule 119 is not limited thereto, and various modifications thereof are possible.

The silicon photonics chip 120 is a semiconductor substrate formed of silicon photonics. For example, the silicon photonics chip 120 is formed using silicon as a main material by a microfabrication technique such as silicon large scale integration (LSI). In addition, the silicon photonics chip 120 may be formed with an electronic circuit, in addition to the optical circuit.

As illustrated in FIG. 2, the silicon photonics chip 120 includes optical connection portions 121 to 128. Each of the optical connection portions 121 to 128 is a portion which is capable of being optically connected to the optical circuit of the silicon photonics chip 120. For example, the optical connection portions 121 to 128 are a light receiving surface through which light may be incident on the optical circuit (e.g., a photoelectric conversion circuit) of the silicon photonics chip 120 or a light emitting surface through which light is emitted from the optical circuit (e.g., a light source or an optical modulator) of the silicon photonics chip 120. In addition, the optical connection portions 121 to 128 may include both the light receiving surface and the light emitting surface.

The optical coupling (optical connection) of the optical connection portions 121 to 128 requires optical axis alignment with high accuracy. For this optical axis alignment, for example, active alignment is used. In active alignment, for example, the ferrule 119 is positioned with respect to the silicon photonics chip 120 so as to monitor the distribution of light while emitting the light from the silicon photonics chip 120 and make the light become the strongest.

Then, in a state where the ferrule 119 is positioned with respect to the silicon photonics chip 120, the lower surface 119a of the ferrule 119 is bonded to the silicon photonics chip 120 by the adhesive 130. Therefore, the end portions of the optical fibers 111 to 118 may be optically connected to the optical connection portions 121 to 128, respectively.

The adhesive 130 is, for example, an ultraviolet curable resin that is cured by irradiation with ultraviolet rays. For example, the adhesive 130 has a property of shrinking upon curing. In addition, the adhesive 130 is coated over the surface of the silicon photonics chip 120 on the ferrule 119 side before the silicon photonics chip 120 and the ferrule 119 are bonded to each other. However, the adhesive 130 may be coated over the lower surface 119a, or may be coated over both the surface of the silicon photonics chip 120 and the lower surface 119a. In addition, the adhesive 130 has a viscosity by which the adhesive 130 remains to some extent in the coated area of the silicon photonics chip 120 or the ferrule 119 before curing.

The groove 119b is formed in the lower surface 119a of the ferrule 119. In addition, the groove 119b is formed along the edge (periphery) of the lower surface 119a of the ferrule 119. The edge of the lower surface 119a is an outer boundary portion of the lower surface 119a. Providing the groove 119b along the edge of the ferrule 119 means, for example, that the groove 119b is formed close to the edge of the optical fiber array 110 so as to conform to the shape of the edge of the ferrule 119. In addition, the groove 119b may not be formed along the entire edge of the lower surface 119a, or may be formed along a portion of the edge of the lower surface 119a.

In the example illustrated in FIGS. 1 to 3, the groove 119b is formed so as to surround an area of the lower surface 119a where the end portions of the optical fibers 111 to 118 are exposed, i.e., formed along the entire edge of the lower surface 119a. Thus, the groove 119b includes a groove formed along each longitudinal side (each of the upper and lower sides in FIG. 3) of the lower surface 119a.

The width of the groove 119b is set such that a portion of the adhesive 130 before curing which is present at the opening of the groove 119b is absorbed into the groove 119b by a capillary phenomenon. For example, the width of the groove 119b may be about 10 μm to 100 μm. However, the width of the groove 119b is not limited to about 10 μm to 100 μm, but is set such that the above-described capillary phenomenon occurs according to the material of the ferrule 119, the material of the adhesive 130, or the coating amount of the adhesive 130.

Formation of the groove 119b in the ferrule 119 may be performed by, for example, etching or cutting (e.g., laser processing). Alternatively, when forming the ferrule 119 via combination of a plurality of parts, the groove 119b may be formed in the ferrule 119 by manufacturing a plurality of parts such that the groove 119b is formed after the combination.

Optical Module According to First Embodiment

Figure 4:
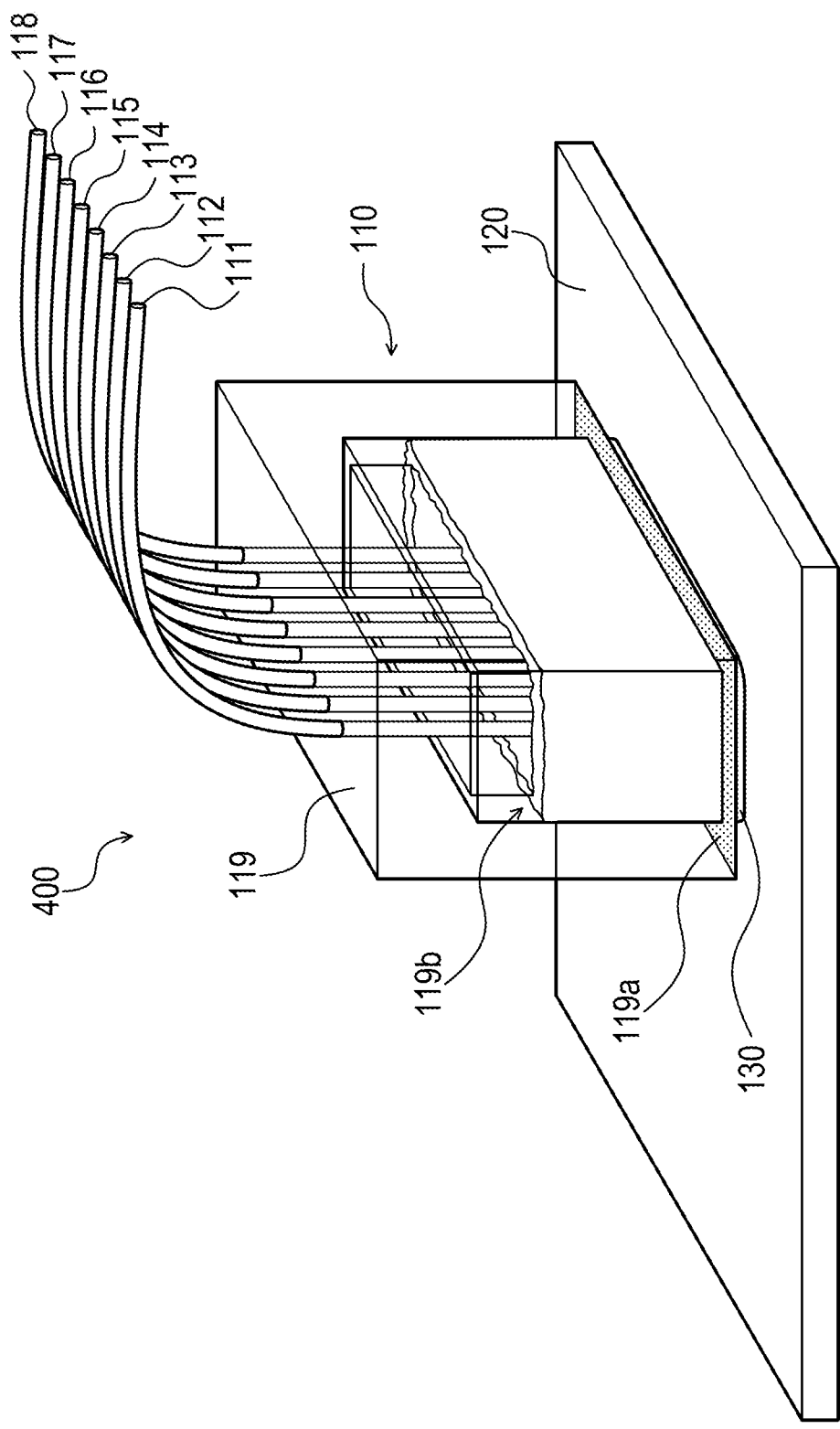
FIG. 4 is a perspective view illustrating an example of an optical module according to the first embodiment.
Figure 5:
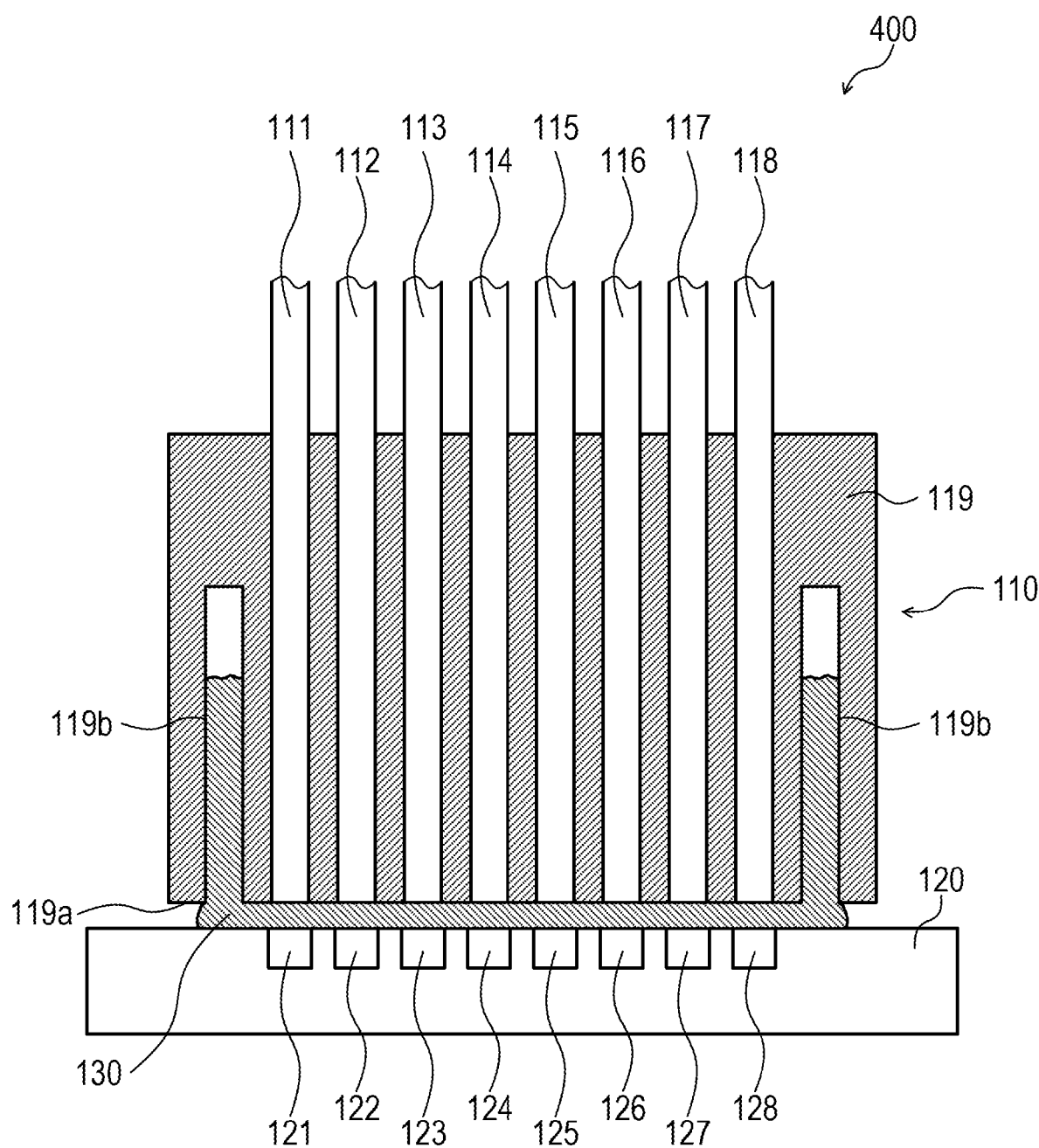
FIG. 5 is a cross-sectional view illustrating the example of the optical module according to the first embodiment.

FIG. 4 is a perspective view illustrating an example of an optical module according to the first embodiment. FIG. 5 is a cross-sectional view illustrating the example of the optical module according to the first embodiment. In FIGS. 4 and 5, portions similar to those illustrated in FIGS. 1 and 2 will be denoted by the same reference numerals, and a description thereof will be omitted.

For example, when the ferrule 119 is brought close to the silicon photonics chip 120 in a state illustrated in FIGS. 1 and 2, as illustrated in FIGS. 4 and 5, the ferrule 119 and the silicon photonics chip 120 are brought into contact with each other via the adhesive 130 before curing. When alignment of the ferrule 119 with respect to the silicon photonics chip 120 is performed in this state, the optical fibers 111 to 118 are optically connected to the optical connection portions 121 to 128 of the silicon photonics chip 120, respectively. Therefore, an optical device 400 including the ferrule 119 and the silicon photonics chip 120 is realized.

In addition, a portion of the adhesive 130 before curing which does not enter the area surrounded by the groove 119b is absorbed into the groove 119b by a capillary phenomenon, and the adhesive 130 is suppressed from protruding from the lower surface 119a of the ferrule 119. Therefore, it is possible to suppress the adhesive 130 protruding from the lower surface 119a of the ferrule 119 from adhering to the side surface of the ferrule 119 due to for example, a capillary phenomenon.

Processing of Curing Adhesive According to First Embodiment

Figure 6:
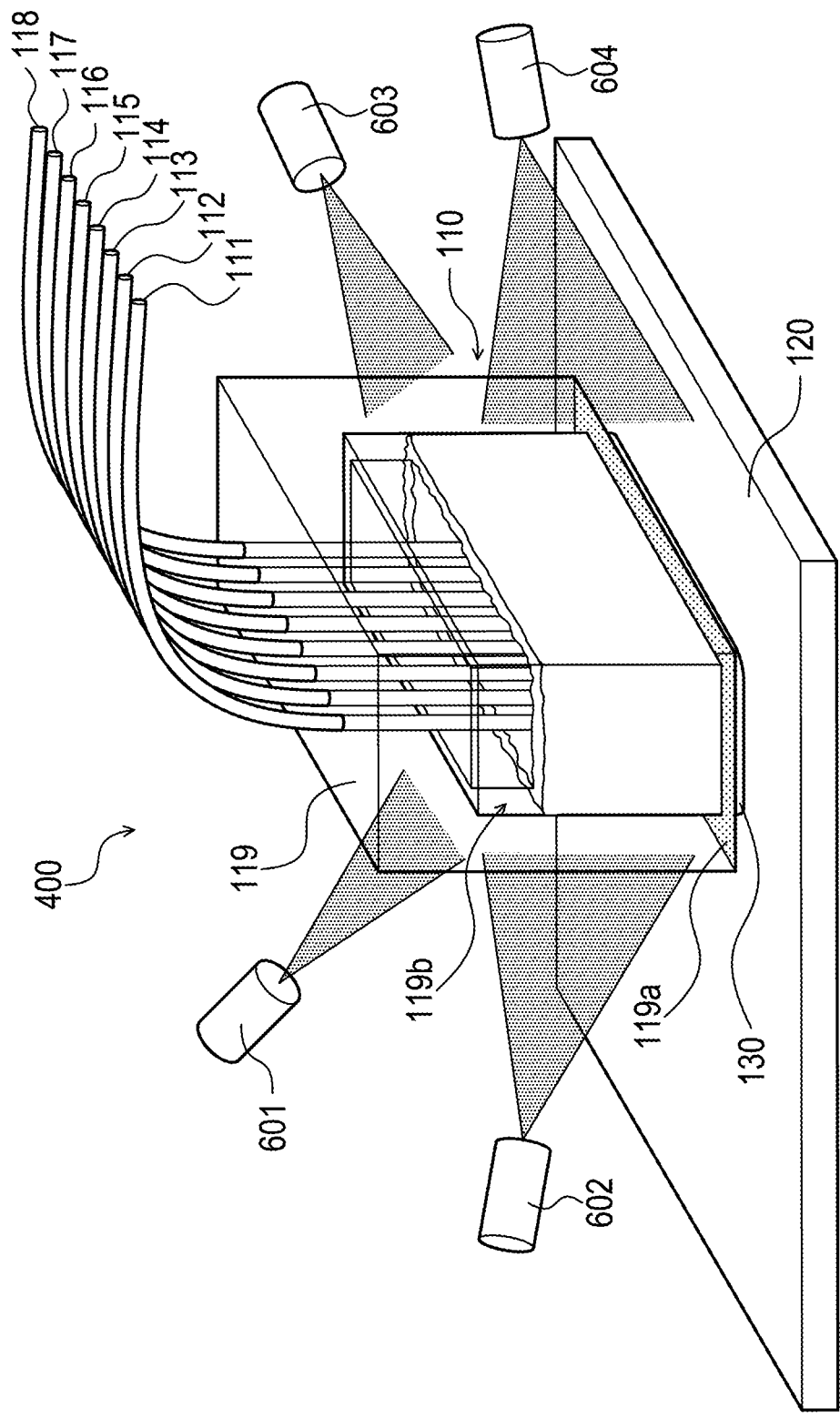
FIG. 6 is a view illustrating an example of a processing of curing an adhesive according to the first embodiment.

FIG. 6 is a view illustrating an example of a processing of curing an adhesive according to the first embodiment. In FIG. 6, portions similar to those illustrated in FIG. 4 will be denoted by the same reference numerals, and a description thereof will be omitted. For example, in a state illustrated in FIGS. 4 and 5, the adhesive 130 may be cured by irradiating the adhesive 130 with ultraviolet rays by ultraviolet lights 601 to 604 as illustrated in FIG. 6. At this time, since the ferrule 119 is formed of a transparent material as described above, the adhesive 130 may be irradiated with ultraviolet rays through the ferrule 119. The ferrule 119 is bonded to the silicon photonics chip 120 by the curing of the adhesive 130.

For the ultraviolet lights 601 to 604, for example, an ultraviolet light emitting diode (LED) light may be used. In the example illustrated in FIG. 6, a processing of irradiating the adhesive 130 with ultraviolet rays using the ultraviolet lights 601 to 604 has been described, but, for example, the type, number, position, size, and direction of ultraviolet lights used to irradiate the adhesive 130 with ultraviolet rays are not limited to the example illustrated in FIG. 6 and may be modified.

As described above, since the groove 119b absorbs the adhesive 130 before curing, adhesion of the adhesive 130 to the side surface of the ferrule 119 is suppressed. Thus, when the adhesive 130 is irradiated with ultraviolet rays, it is possible to suppress the ferrule 119 from moving in parallel with the lower surface 119a by the curing shrinkage of the adhesive 130 which is unevenly adhered to the side surface of the ferrule 119. Therefore, it is possible to suppress the positional deviation of the ferrule 119 with respect to the silicon photonics chip 120. Therefore, it is possible to suppress, for example, deterioration in optical coupling efficiency between the optical fibers 111 to 118 and the optical connection portions 121 to 128.

In addition, since the adhesive 130 enters the groove 119b, it is possible to increase the contact area between the ferrule 119 and the adhesive 130 and to enhance the bonding strength between the ferrule 119 and the adhesive 130.

Optical Module Including Ferrule Having Hole According to First Embodiment

Figure 7:
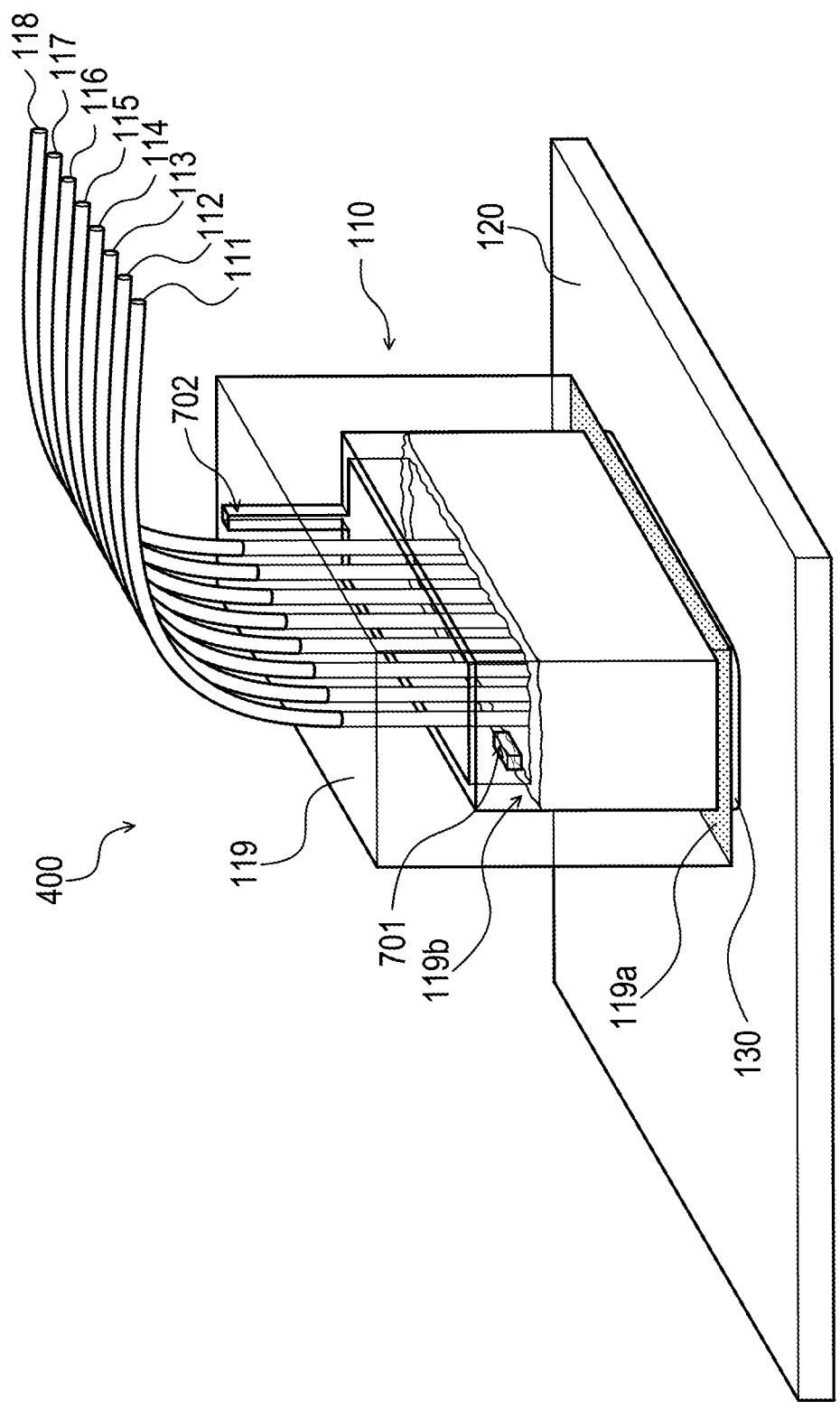
FIG. 7 is a perspective view illustrating an example of an optical module including a ferrule having a hole according to the first embodiment.
Figure 8:
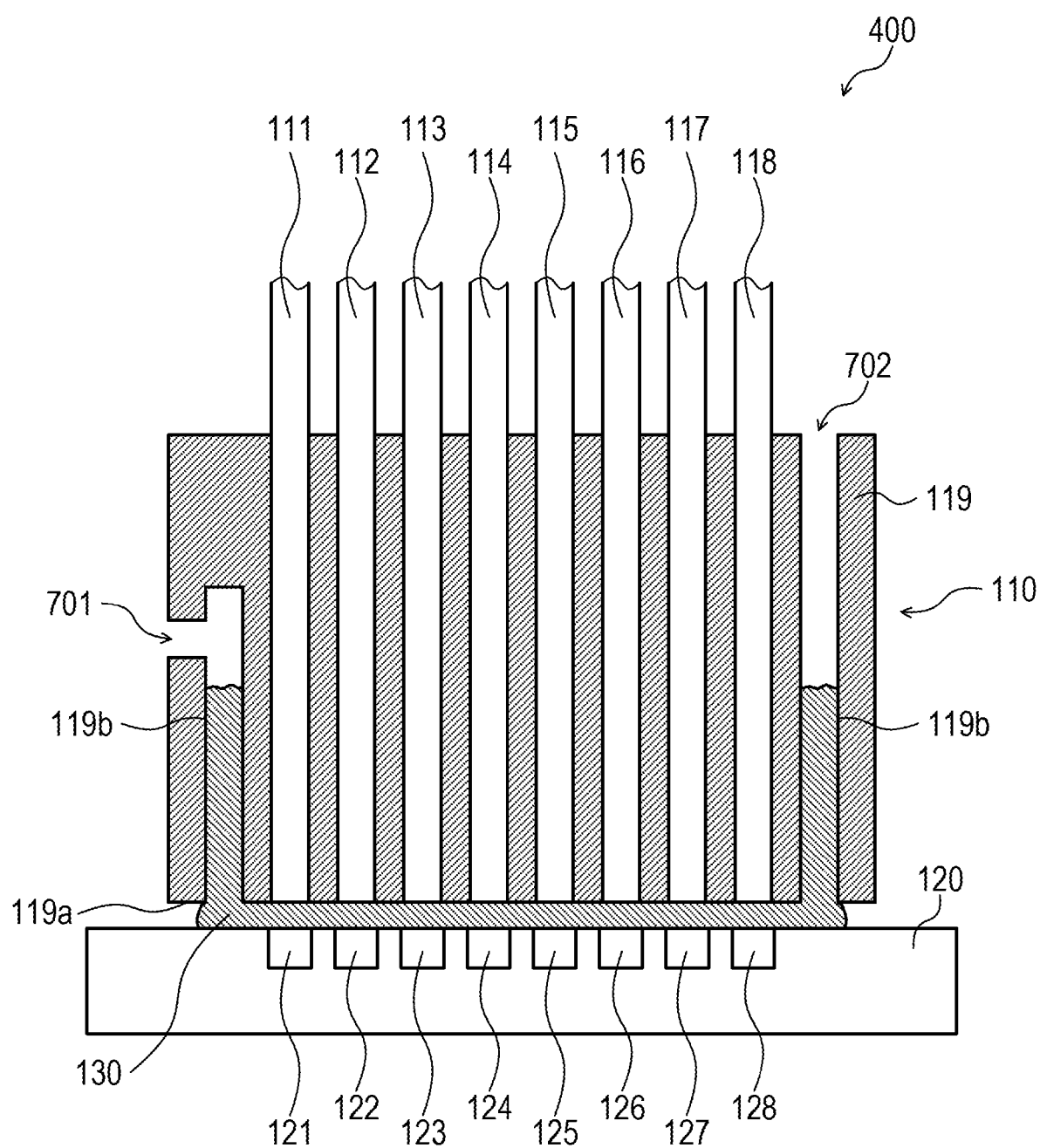
FIG. 8 is a cross-sectional view illustrating the example of the optical module including the ferrule having the hole according to the first embodiment.

FIG. 7 is a perspective view illustrating an example of an optical module including a ferrule having a hole according to the first embodiment. FIG. 8 is a cross-sectional view illustrating the example of the optical module including the ferrule having the hole according to the first embodiment. In FIGS. 7 and 8, portions similar to those illustrated in FIGS. 4 and 5 will be denoted by the same reference numerals, and a description thereof will be omitted. The ferrule 119 may have, for example, at least one of holes 701 and 702. The hole 701 penetrates from the side surface (the surface perpendicular to the lower surface 119a) of the ferrule 119 to the groove 119b. The hole 702 penetrates from the upper surface (the surface opposite to the lower surface 119a) of the ferrule 119 to the groove 119b.

The holes 701 and 702 are escape holes for air inside the groove 119b. That is, when the groove 119b absorbs the adhesive 130 before curing, the air inside the groove 119b is discharged from the ferrule 119 through the holes 701 and 702. Therefore, an increase in air pressure inside the groove 119b may be suppressed, and the groove 119b may efficiently absorb the adhesive 130 before curing.

In addition, the holes 701 and 702 are connected to positions in the groove 119b which are relatively far from the lower surface 119a. Therefore, it is possible to suppress the adhesive 130 before curing which has been absorbed by the groove 119b from reaching the holes 701 and 702 and from leaking from the side surface of the ferrule 119 through the holes 701 and 702.

In addition, since the hole 702 is formed so as to be linearly connected to the groove 119b, it is possible to view the lower surface side (e.g., the silicon photonics chip 120 or the adhesive 130) of the ferrule 119 from the upper surface side through the hole 702 and the groove 119b. Therefore, when the ferrule 119 is formed on the silicon photonics chip 120, it is possible to view, from the upper surface side of the ferrule 119, whether or not the adhesive 130 before curing has reached the groove 119b portion. Therefore, it is possible to easily confirm whether or not the adhesive 130 spreads sufficiently within a range in which the adhesive 130 does not protrude from the groove 119b.

In the example illustrated in FIGS. 7 and 8, a configuration in which the holes 701 and 702 are formed as escape holes for the air inside the groove 119b has been described, but, for example, the number, position, size, and direction of escape holes for the air inside the groove 119b are not limited to the example illustrated in FIGS. 7 and 8, and various modifications thereof are possible.

Another Example of Groove in Ferrule According to First Embodiment

Figure 9:
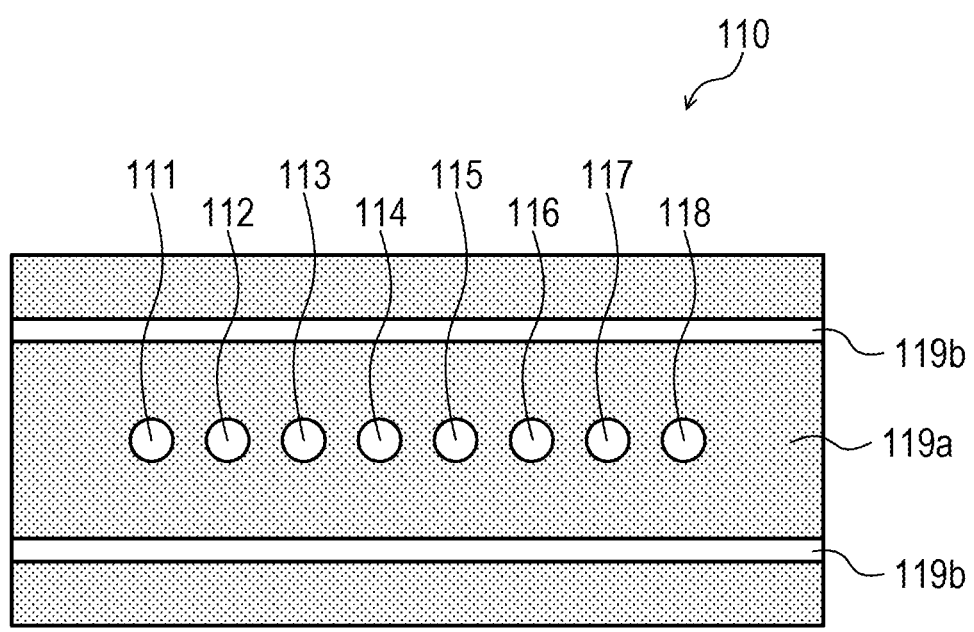
FIG. 9 is a bottom view illustrating another example of a groove in the ferrule according to the first embodiment.

FIG. 9 is a bottom view illustrating another example of the groove in the ferrule according to the first embodiment. In FIG. 9, portions similar to those illustrated in FIG. 3 will be denoted by the same reference numerals, and a description thereof will be omitted. As illustrated in FIG. 9, the groove 119b may be formed along each longitudinal side (each of the upper and lower sides in the drawing) of the lower surface 119a.

Since the ferrule 119 is a rectangular parallelepiped, the adhesive 130 before curing 130 which spreads while being sandwiched between the silicon photonics chip 120 and the ferrule 119 more easily protrudes from the longitudinal side (long side) of the lower surface 119a than each short side (each of the left and right sides in the drawing) of the lower surface 119a. Thus, since the groove 119b is provided along each longitudinal side of the lower surface 119a, it is possible to efficiently suppress the protrusion of the adhesive 130 before curing.

In addition, the groove 119b is formed so as to reach each short side of the lower surface 119a. Thus, the groove 119b may be easily formed, for example, by straightly moving, for example, a cutting blade with respect to the ferrule 119 in the longitudinal direction of the lower surface 119a before forming the groove 119b. In addition, since the air inside the groove 119b is discharged from the side surface of the ferrule 119 when the groove 119b absorbs the adhesive 130 before curing, an increase in air pressure inside the groove 119b may be suppressed and the groove 119b may efficiently absorb the adhesive 130 before curing. However, the groove 119*b* may not reach each short side of the lower surface 119*a*.

Figure 10:
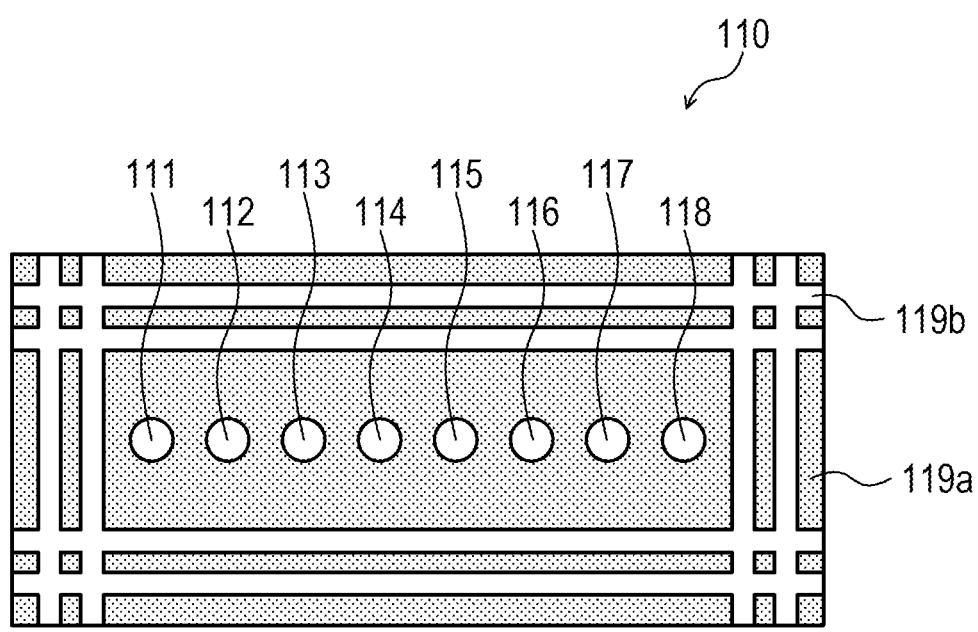
FIG. 10 is a bottom view illustrating still another example of the groove in the ferrule according to the first embodiment.

FIG. 10 is a bottom view illustrating still another example of the groove in the ferrule according to the first embodiment. In FIG. 10, portions similar to those illustrated in FIGS. 3 and 9 will be denoted by the same reference numerals, and a description thereof will be omitted. As illustrated in FIG. 10, a plurality of grooves 119*b* may be formed along the edge of the lower surface 119*a*. In the example illustrated in FIG. 10, two grooves are formed along each longitudinal side of the lower surface 119*a* (each of the upper and lower sides in the drawing) and two grooves are formed along each short side (each of the left and right sides in the drawing) of the lower surface 119*a* so that lattice-shaped grooves 119*b* are formed.

By providing the plurality of grooves along the edge of the lower surface 119*a*, since the adhesive 130 before curing which is not absorbed by the inner groove may be absorbed by the outer groove, it is possible to increase the absorption capacity of the adhesive 130 before curing. Therefore, for example, it is possible to increase the allowable amount of a variation in the coating amount of the adhesive 130. In addition, it is possible to increase the contact area between the ferrule 119 and the adhesive 130 and to enhance the bonding strength between the ferrule 119 and the adhesive 130.

As described above, a holding member according to the first embodiment has a groove formed along the edge of a surface thereof where the end portion of an optical fiber is exposed and which is bonded to a semiconductor substrate by an adhesive. Therefore, it is possible to suppress the adhesive before curing from protruding from the holding member and to suppress the position of the holding member from deviating due to the curing shrinkage of the protruding adhesive. Therefore, it is possible to suppress the positional deviation of the holding member with respect to the semiconductor substrate due to the curing shrinkage of the adhesive.

For example, the ferrule 119 has the groove 119*b* formed along the edge of the lower surface 119*a* where the end portions of the optical fibers 111 to 118 are exposed to be bonded to the silicon photonics chip 120 by the adhesive 130. Therefore, it is possible to suppress the adhesive 130 before curing from protruding from the ferrule 119 and to suppress the position of the ferrule 119 from deviating due to the curing shrinkage of the protruding adhesive 130. Therefore, it is possible to suppress the positional deviation of the ferrule 119 with respect to the silicon photonics chip 120 due to the curing shrinkage of the adhesive 130.

In addition, the groove 119*b* in the ferrule 119 includes a groove formed along the longitudinal side of the lower surface 119*a*. Therefore, the adhesive 130 before curing which spreads toward the longitudinal side of the lower surface 119*a* from which the adhesive 130 easily protrudes may be absorbed by the groove 119*b*. Therefore, it is possible to efficiently suppress the protrusion of the adhesive 130 before curing.

In addition, the ferrule 119 may have the hole 701 or the hole 702 which penetrates from the inside of the groove 119*b* to a surface (side surface or upper surface) different from the lower surface 119*a*. Therefore, when the groove 119*b* absorbs the adhesive 130 before curing, the air inside the groove 119*b* is discharged from the ferrule 119 through the hole 701 or the hole 702. Therefore, an increase in air pressure inside the groove 119*b* may be suppressed, and the groove 119*b* may efficiently absorb the adhesive 130 before curing.

Second Embodiment

In a second embodiment, portions different from those in the first embodiment will be described. In the first embodiment, a configuration in which the groove 119*b* is formed in the ferrule 119 has been described, but in the second embodiment, a configuration in which a guide ring is provided in the ferrule 119 will be described.

Ferrule According to Second Embodiment

Figure 11:
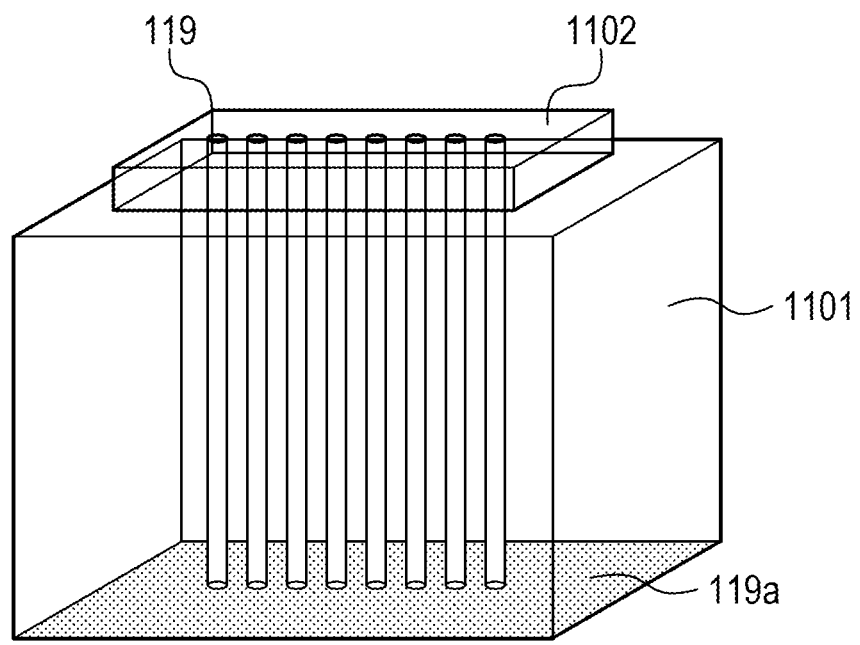
FIG. 11 is a perspective view illustrating an example of a ferrule according to a second embodiment.

FIG. 11 is a perspective view illustrating an example of a ferrule according to a second embodiment. As illustrated in FIG. 11, the ferrule 119 according to the second embodiment includes a main body portion 1101 and a convex portion 1102 formed on the upper surface (the upper surface in FIG. 11) of the main body portion 1101. Respective holes in the ferrule 119 which hold therein the optical fibers 111 to 118 penetrate from the lower surface 119*a* (the lower surface in FIG. 11) of the main body portion 1101 to the upper surface of the convex portion 1102.

The main body portion 1101 has a shape in which a rectangular parallelepiped is formed with holes which hold therein the optical fibers 111 to 118. The convex portion 1102 has a shape in which a rectangular parallelepiped smaller than the main body portion 1101 is formed with holes which hold therein the optical fibers 111 to 118. The convex portion 1102 is formed substantially at the center of the upper surface of the main body portion 1101. Therefore, a step is formed for positioning a guide ring to be described later with respect to the ferrule 119. The main body portion 1101 and the convex portion 1102 are integrally formed, for example, for the high precision positioning of the guide ring with respect to the ferrule 119. However, the main body portion 1101 and the convex portion 1102 may be separately formed and be bonded to each other.

Guide Ring According to Second Embodiment

Figure 12:
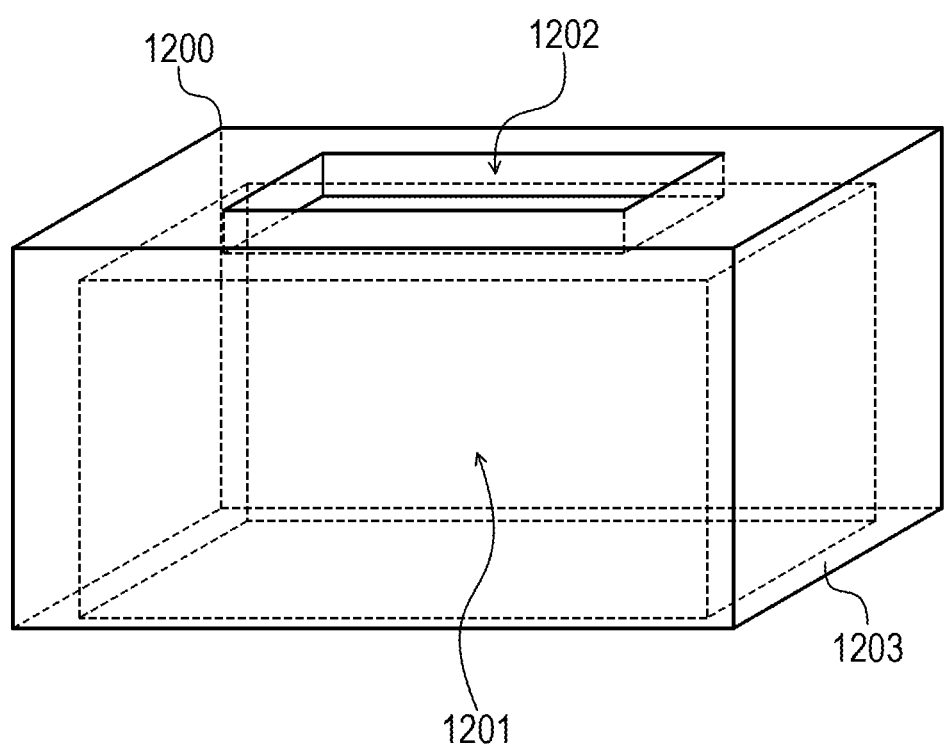
FIG. 12 is a perspective view illustrating an example of a guide ring according to the second embodiment.

FIG. 12 is a perspective view illustrating an example of a guide ring according to the second embodiment. The ferrule 119 illustrated in FIG. 11 is provided with, for example, a guide ring 1200 illustrated in FIG. 12. The guide ring 1200 has an opening 1201 which is open to the lower surface side (the lower side in FIG. 12) and an opening 1202 which is open to the upper surface side (the upper side in FIG. 12).

The opening 1201 has a size and a shape in which the opening 1201 covers a portion of the main body portion 1101 of the ferrule 119 illustrated in FIG. 11 excluding the vicinity of the lower surface 119*a* with a gap between the opening 1201 and the main body portion 1101. The opening 1202 has substantially the same size and shape as the convex portion 1102 of the ferrule 119 illustrated in FIG. 11. The guide ring 1200 may be transparent or opaque. In the example illustrated in FIG. 12, the guide ring 1200 is opaque. For example, the guide ring 1200 may be formed of a metal or a resin.

In addition, a lower surface 1203 (the lower surface in FIG. 12) of the guide ring 1200 is formed so as to be parallel to the lower surface 119*a* of the ferrule 119 in a case where the ferrule 119 is provided with the guide ring 1200.

In addition, at least the outer peripheral surface of the guide ring 1200 has stronger water repellency than the surface of the ferrule 119. The outer peripheral surface of the guide ring 1200 is, for example, a surface (four side surfaces) which is not formed with the opening 1201 or the opening 1202 among respective hexagonal outer surfaces of the guide ring 1200. For example, a water repellency processing is performed on the outer peripheral surface of the guide ring 1200 for strengthening water repellency. Therefore, it is possible to suppress the adhesion of the adhesive 130 before curing to the outer peripheral surface of the guide ring 1200.

Ferrule Provided with Guide Ring According to Second Embodiment

Figure 13:
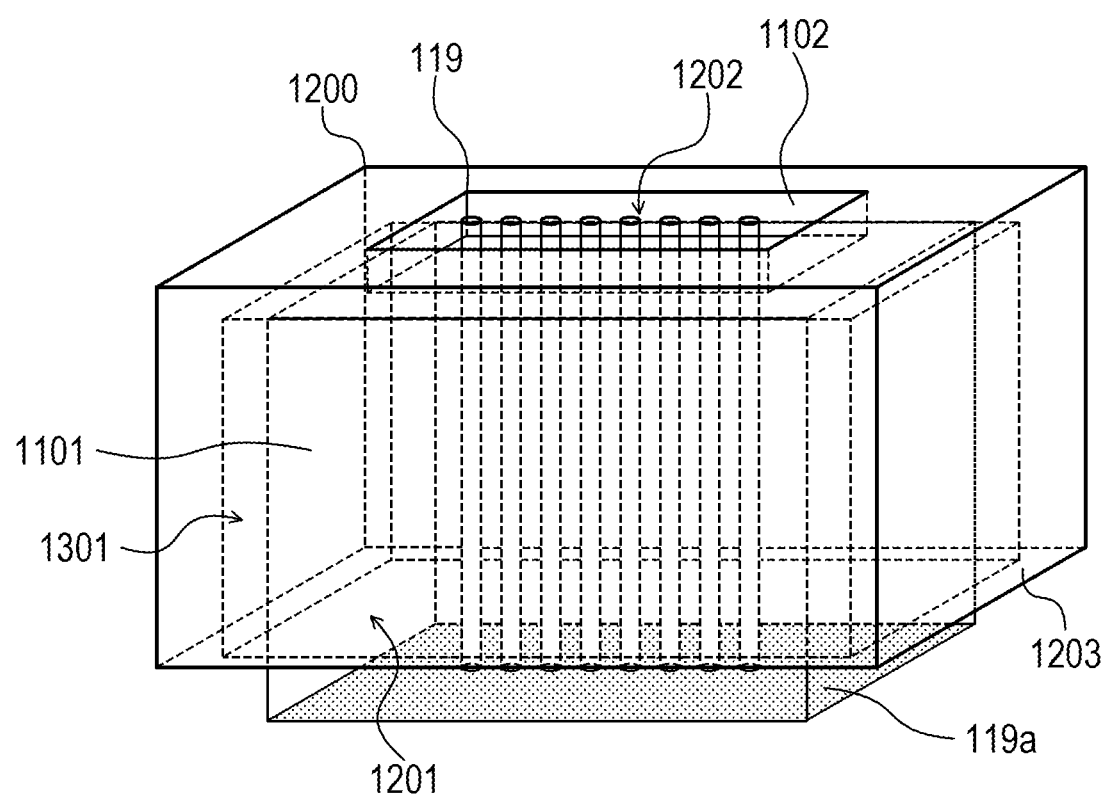
FIG. 13 is a perspective view illustrating an example of the ferrule provided with the guide ring according to the second embodiment.
Figure 14:
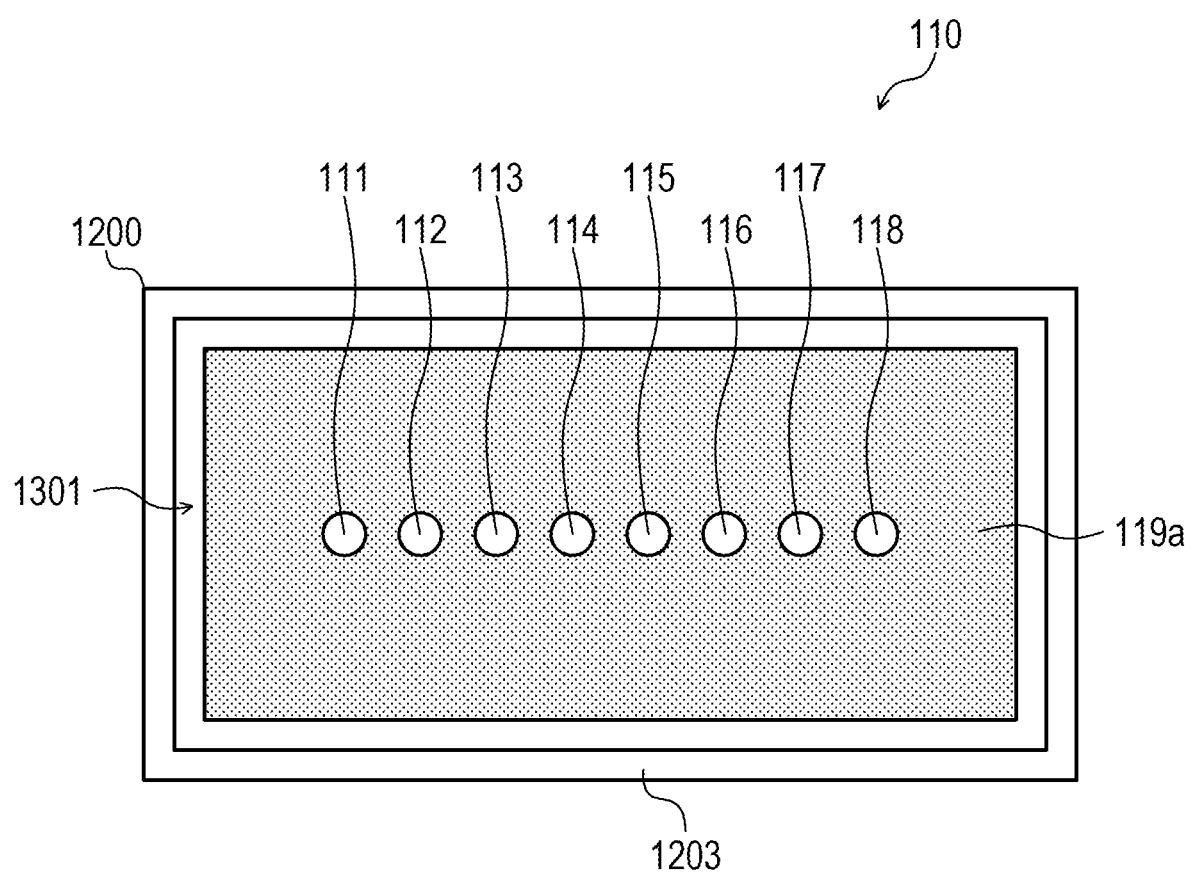
FIG. 14 is a bottom view illustrating the example of the ferrule provided with the guide ring according to the second embodiment.
Figure 15:
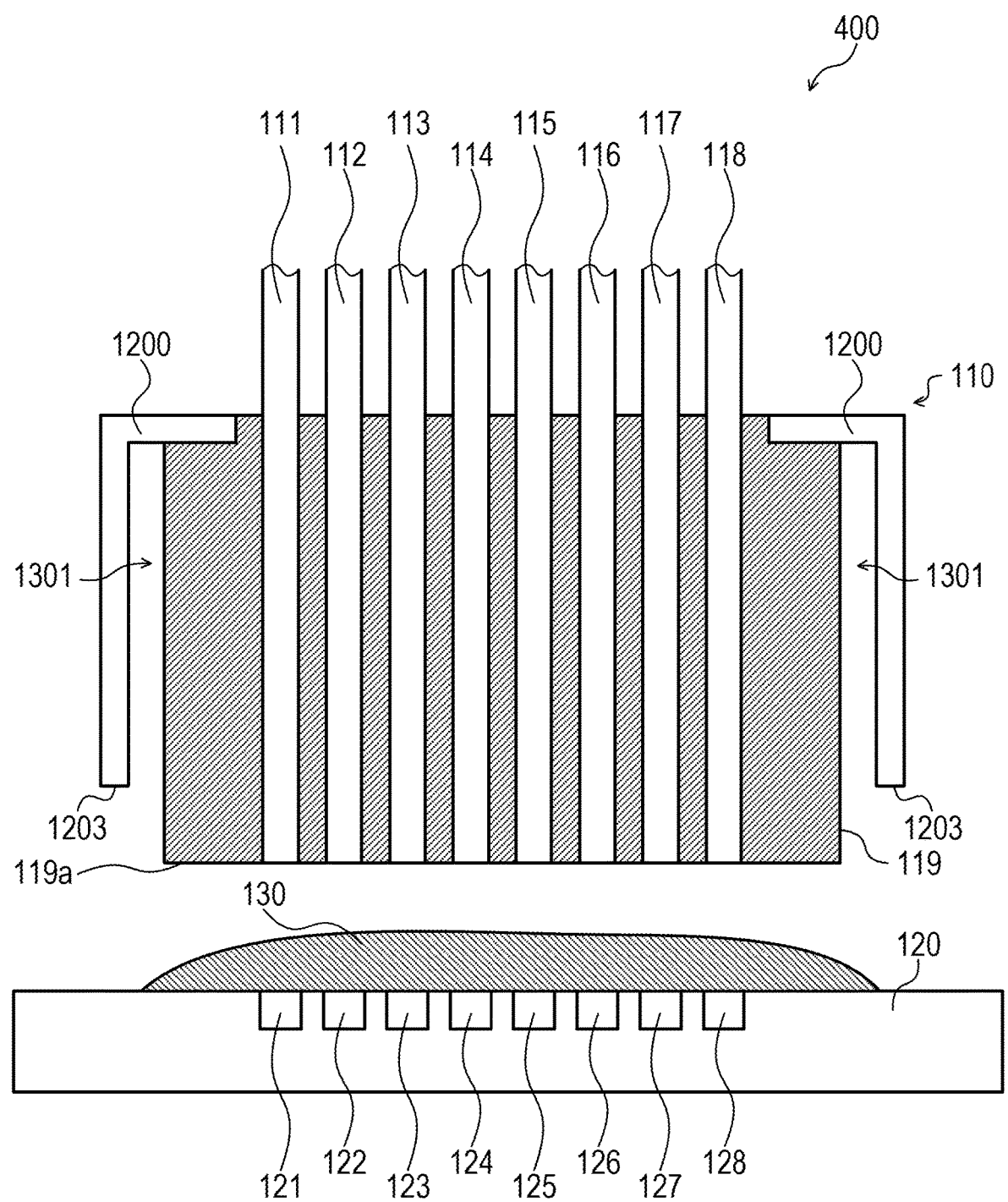
FIG. 15 is a cross-sectional view illustrating an example of the ferrule provided with the guide ring and a silicon photonics chip according to the second embodiment.

FIG. 13 is a perspective view illustrating an example of the ferrule provided with the guide ring according to the second embodiment. FIG. 14 is a bottom view illustrating the example of the ferrule provided with the guide ring according to the second embodiment. FIG. 15 is a cross-sectional view illustrating an example of the ferrule provided with the guide ring and a silicon photonics chip according to the second embodiment.

In FIGS. 13 to 15, portions similar to those illustrated in FIGS. 2, 11, and 12 will be denoted by the same reference numerals, and a description thereof will be omitted. When the ferrule 119 illustrated in FIG. 11 is provided with the guide ring 1200 illustrated in FIG. 12, a state illustrated in FIGS. 13 to 15 is obtained. In the state illustrated in FIGS. 13 to 15, the guide ring 1200 is positioned with respect to the ferrule 119 by fitting the convex portion 1102 of the ferrule 119 into the opening 1202 in the guide ring 1200.

In addition, a portion of the main body portion 1101 of the ferrule 119 excluding the vicinity of the lower surface 119a is covered with the opening 1201 in the guide ring 1200, and a gap 1301 is formed between the side surface of the main body portion 1101 and the inside of the guide ring 1200.

The size and shape of the guide ring 1200 are set such that the width of the gap 1301 (the distance between the side surface of the main body portion 1101 and the inside of the guide ring 1200) is a predetermined width. The predetermined width is a width at which the gap 1301 absorbs the adhesive 130 before curing by a capillary phenomenon, similarly to the above-described groove 119b, and is, for example, about 10 µm to 100 µm. However, the width of the gap 1301 is not limited to 10 µm to 100 µm, and is set such that the above-described capillary phenomenon occurs according to the material of the ferrule 119, the material of the adhesive 130, the material of the guide ring 1200, or the coating amount of the adhesive 130.

Optical Module According to Second Embodiment

Figure 16:
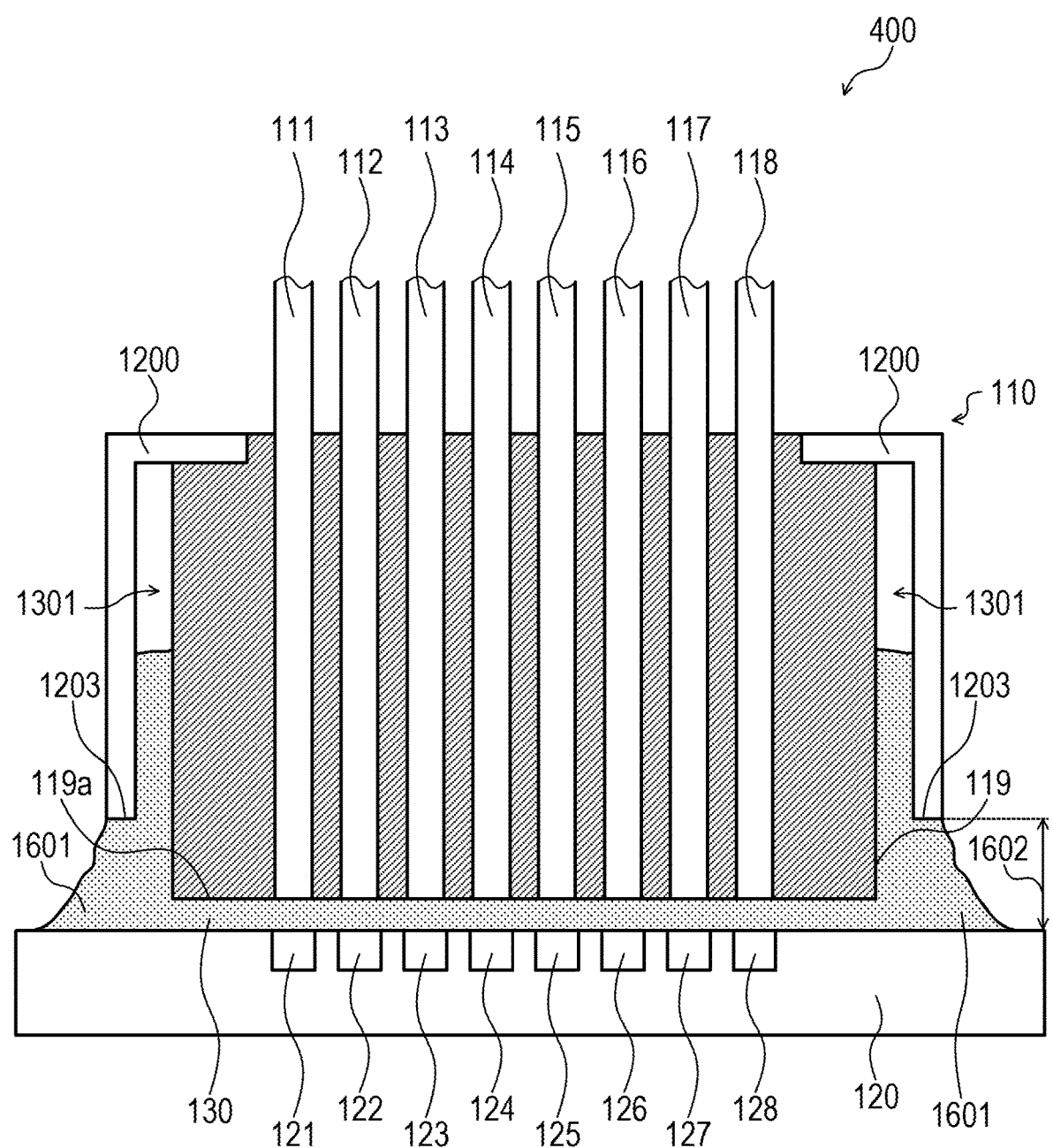
FIG. 16 is a cross-sectional view illustrating an example of an optical module according to the second embodiment.

FIG. 16 is a cross-sectional view illustrating an example of an optical module according to the second embodiment. In FIG. 16, portions similar to those illustrated in FIGS. 5, 13, and 15 will be denoted by the same reference numerals, and a description thereof will be omitted.

For example, when the ferrule 119 is brought close to the silicon photonics chip 120 in a state illustrated in FIG. 15, as illustrated in FIG. 16, the ferrule 119 and the silicon photonics chip 120 are brought into contact with each other via the adhesive 130 before curing. When alignment of the ferrule 119 with respect to the silicon photonics chip 120 is performed in this state, the optical fibers 111 to 118 are optically connected to the optical connection portions 121 to 128 of the silicon photonics chip 120, respectively. Therefore, the optical device 400 including the ferrule 119 and the silicon photonics chip 120 is realized.

In addition, a portion of the adhesive 130 before curing which does not enter the area surrounded by the gap 1301 is absorbed into the gap 1301 by a capillary phenomenon. In addition, since the outer peripheral surface of the guide ring 1200 has strong water repellency as described above, adhesion of the adhesive 130 before curing to the outer peripheral surface of the guide ring 1200 is suppressed.

Therefore, a fillet 1601 is formed between the surface of the guide ring 1200 on the silicon photonics chip 120 side and the surface of the silicon photonics chip 120 on the guide ring 1200 side. The fillet 1601 is a portion of the adhesive 130 which protrudes from the lower surface 119a of the ferrule 119 and rises on the side surface of the ferrule 119 by a capillary phenomenon.

In addition, as described above, the lower surface 1203 of the guide ring 1200 is formed so as to be parallel to the lower surface 119a of the ferrule 119. Thus, when the ferrule 119 is positioned with respect to the silicon photonics chip 120 with high accuracy, a height 1602 of the fillet 1601 which is formed along the outer periphery of the ferrule 119 may be consistent.

Therefore, since the amount of the adhesive 130 before curing which protrudes from the lower surface 119a may be consistent in respective directions, even if the curing shrinkage of the adhesive 130 occurs, the force with which the ferrule 119 is pulled by the surrounding fillet 1601 is uniform. Therefore, it is possible to suppress the ferrule 119 from moving in parallel with the lower surface 119a and to suppress the positional deviation of the ferrule 119 with respect to the silicon photonics chip 120.

In addition, since the adhesive 130 enters the gap 1301, it is possible to increase the contact area between the ferrule 119 and the adhesive 130 and to enhance the bonding strength between the ferrule 119 and the adhesive 130.

As described above, a holding member according to the second embodiment is provided with a guide member. The guide member is disposed around a second surface of the holding member (the surface of the holding member which is in contact with a first surface of the holding member where the end portion of an optical fiber is exposed, the first surface being bonded to a semiconductor substrate and is perpendicular to the first surface) with a gap between the guide member and the second surface, and a surface of the guide member on the semiconductor substrate side is parallel to the first surface of the holding member. Therefore, it is possible to make the amount of the adhesive before curing which protrudes from the holding member be consistent in respective directions and to suppress the position of the holding member from deviating due to the curing shrinkage of the protruding adhesive. Therefore, it is possible to suppress the positional deviation of the holding member with respect to the semiconductor substrate due to the curing shrinkage of the adhesive.

For example, the ferrule 119 according to the second embodiment is provided with the guide ring 1200. The guide ring 1200 has the gap 1301 around the side surface of the ferrule 119, i.e., between the guide ring 1200 and the side surface of the ferrule 119, and the lower surface 1203 is parallel to the lower surface 119a of the ferrule 119. Therefore, it is possible to make the amount of the adhesive 130 before curing (the amount of the fillet 1601) which protrudes from the ferrule 119 be consistent in respective directions and to suppress the position of the ferrule 119 from deviating due to the curing shrinkage of the protruding adhesive 130. Therefore, it is possible to suppress the positional deviation of the ferrule 119 with respect to the silicon photonics chip 120 due to the curing shrinkage of the adhesive 130.

In addition, the gap 1301 between the ferrule 119 and the guide ring 1200 may not be formed along the short side surface of the ferrule 119 as viewed from the lower surface, similarly to the groove 119b illustrated in FIG. 9. For example, the gap 1301 between the ferrule 119 and the guide ring 1200 is formed along the longitudinal side surface of the ferrule 119 as viewed from the lower surface. Therefore, it is possible to make the amount of the adhesive 130 before curing which spreads toward the longitudinal side of the ferrule 119 from which the adhesive easily protrudes be consistent. Therefore, it is possible to efficiently suppress the protrusion of the adhesive 130 before curing.

In addition, since the gap 1301 is not formed along the short side of the ferrule 119 as viewed from the lower surface, it is possible to fix the guide ring 1200 to the short side of the ferrule 119 as viewed from the lower surface. Therefore, the guide ring 1200 may be positioned with respect to the ferrule 119 even if a positioning portion such as, for example, the convex portion 1102 is not set on the ferrule 119.

A configuration in which the guide ring 1200 is formed so that a portion of the main body portion 1101 of the ferrule 119 excluding the vicinity of the lower surface 119a is covered with the opening 1201 in the guide ring 1200 has been described, but the disclosure is not limited to such a configuration. For example, the guide ring 1200 may be formed so as to cover the entire main body portion 1101.

However, in this case, the guide ring 1200 is formed such that the lower surface 1203 of the guide ring 1200 does not more protrude toward the silicon photonics chip 120 side than the lower surface 119a. For example, the guide ring 1200 is formed such that the lower surface 1203 of the guide ring 1200 is flush with the lower surface 119a. Therefore, it is possible to suppress the positioning of the ferrule 119 with respect to the silicon photonics chip 120 from being difficult due to the guide ring 1200 which is in contact with the silicon photonics chip 120.

In addition, a configuration of the ferrule 119 in which the convex portion 1102 is formed on the upper surface of the main body portion 1101 and the guide ring 1200 is formed with the opening 1202 so that the guide ring 1200 is positioned with respect to the ferrule 119 has been described, but the disclosure is not limited to such a configuration. For example, the guide ring 1200 may be positioned with respect to the ferrule 119 by forming unevenness to be fitted to each other at positions where the ferrule 119 and the guide ring 1200 are in contact with each other.

Third Embodiment

With regard to the third embodiment, portions different from those in the first and second embodiments will be described. In the first and second embodiments, a configuration in which the ferrule 119 is formed with the groove 119b or the guide ring 1200 has been described, but in the third embodiment, a configuration in which the ferrule 119 is formed with a constriction portion will be described.

Ferrule and Silicon Photonics Chip According to Third Embodiment

Figure 17:
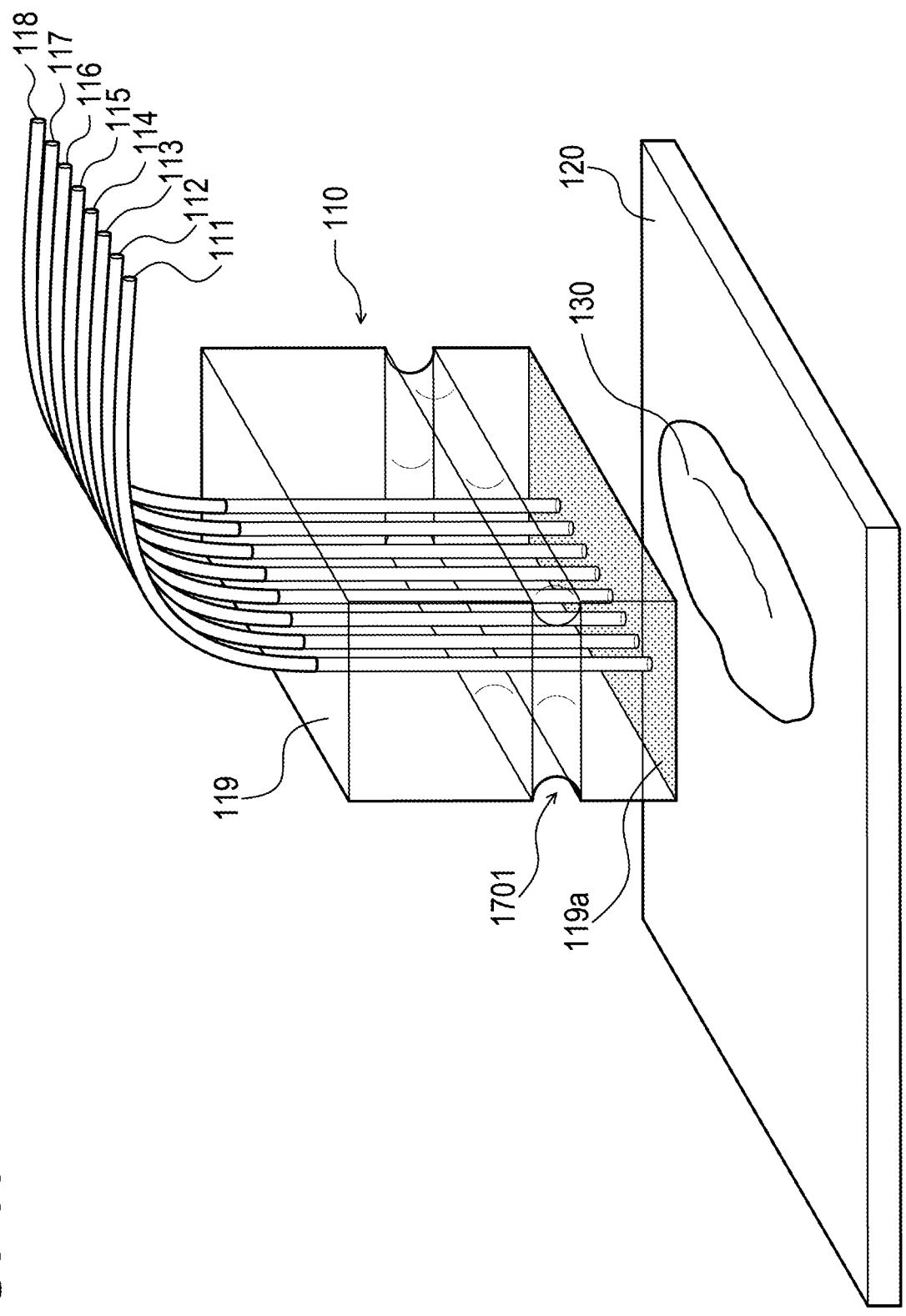
FIG. 17 is a perspective view illustrating an example of a ferrule and a silicon photonics chip according to a third embodiment.
Figure 18:
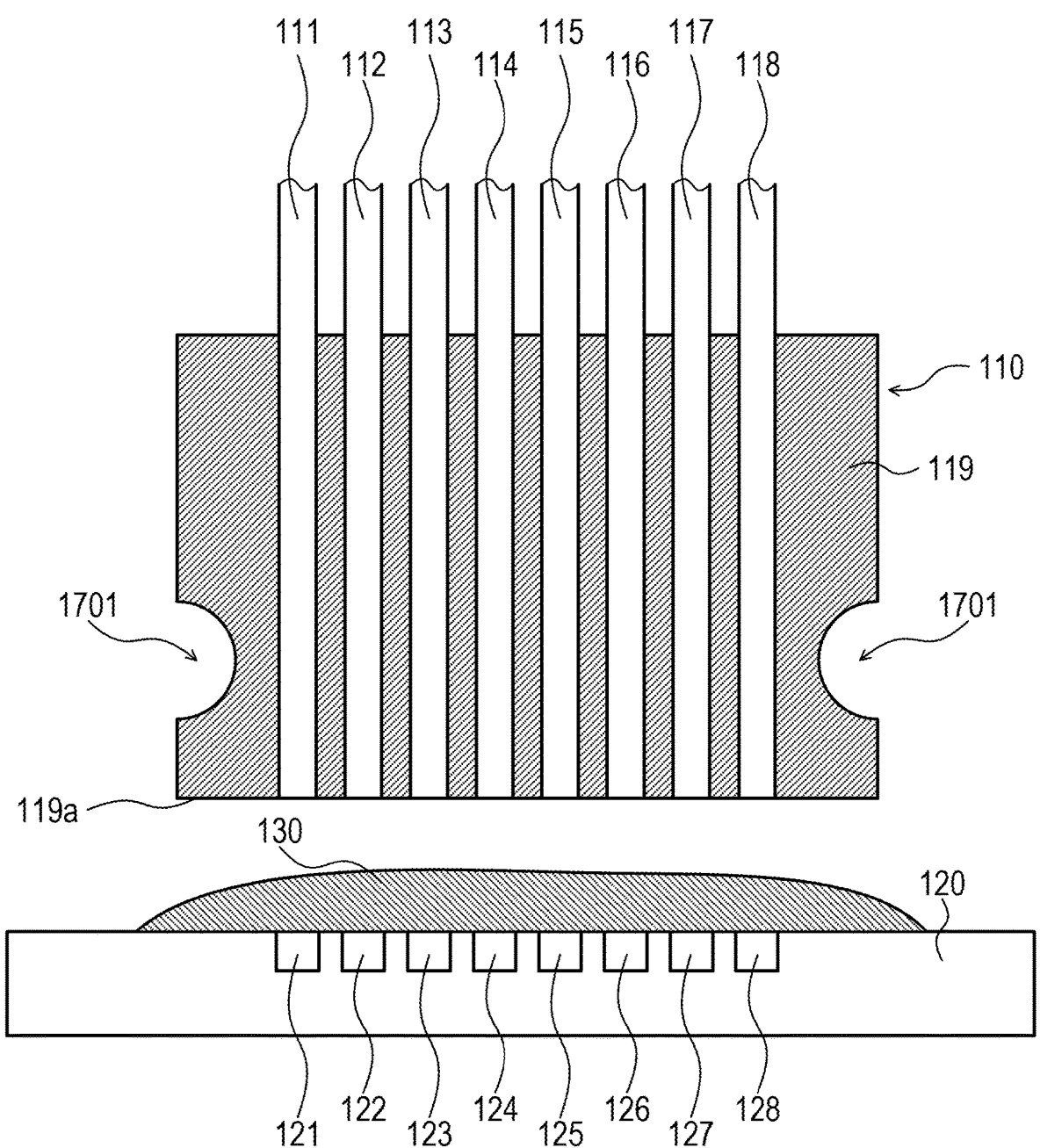
FIG. 18 is a cross-sectional view illustrating the example of the ferrule and the silicon photonics chip according to the third embodiment.

FIG. 17 is a perspective view illustrating an example of a ferrule and a silicon photonics chip according to a third embodiment. FIG. 18 is a cross-sectional view illustrating the example of the ferrule and the silicon photonics chip according to the third embodiment. In FIGS. 17 and 18, portions similar to those illustrated in FIGS. 1 and 2 will be denoted by the same reference numerals, and a description thereof will be omitted.

As illustrated in FIGS. 17 and 18, the ferrule 119 according to the third embodiment has a constriction portion 1701 which is formed on the side surface thereof (the surface which is in contact with the lower surface 119a and is perpendicular to the lower surface 119a) and is parallel to the lower surface 119a. The constriction portion 1701 is formed so as to extend around the side surface of the ferrule 119. The width of the constriction portion 1701 (the height in FIGS. 17 and 18) is a width at which the constriction portion 1701 absorbs the adhesive 130 before curing by a capillary phenomenon, similarly to the above-described groove 119b, and is, for example, about 10 μm to 100 μm. However, the width of the constriction portion 1701 is not limited to 10 μm to 100 μm, but is set such that the above-described capillary phenomenon occurs according to the material of the ferrule 119, the material of the adhesive 130, or the coating amount of the adhesive 130.

The depth (the length in the horizontal direction in FIG. 18) of the constriction portion 1701 is set such that the constriction portion 1701 does not reach holes which hold therein the optical fibers 111 to 118 of the ferrule 119. As the depth of the constriction portion 1701 is increased, the amount of the adhesive 130 before curing which can be absorbed by the constriction portion 1701 may be increased.

Optical Module According to Third Embodiment

Figure 19:
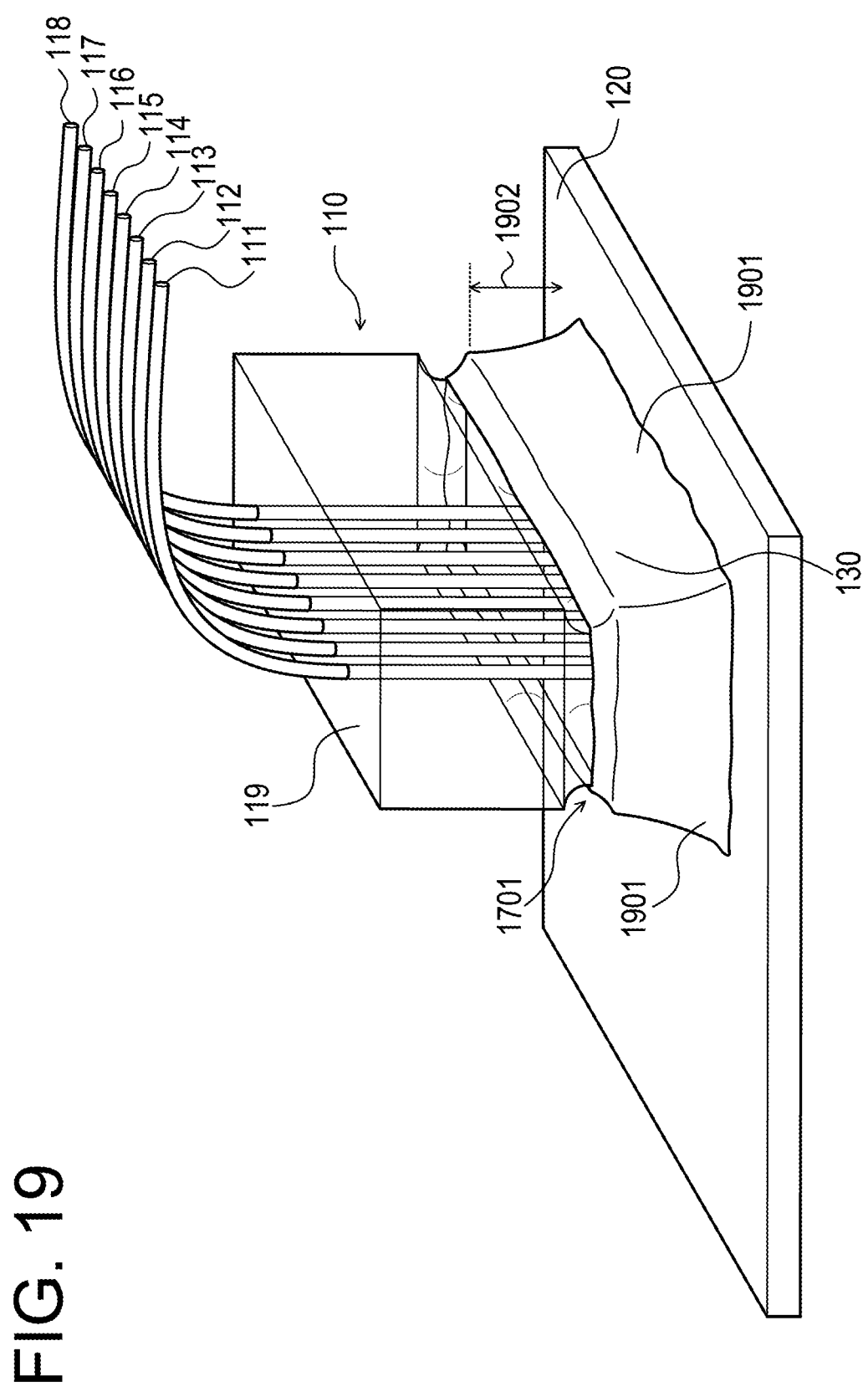
FIG. 19 is a perspective view illustrating an example of an optical module according to the third embodiment.
Figure 20:
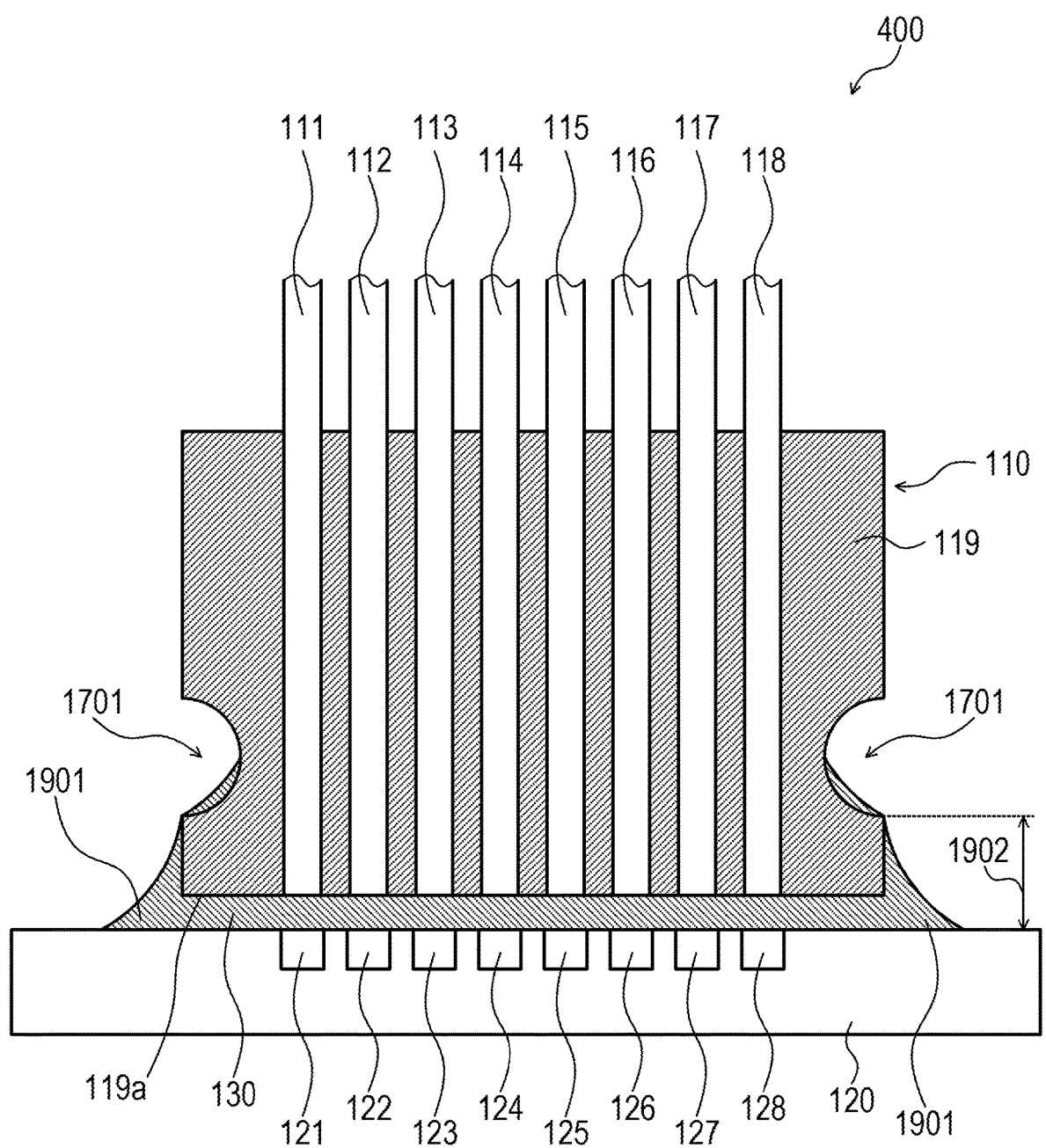
FIG. 20 is a cross-sectional view illustrating the example of the optical module according to the third embodiment.

FIG. 19 is a perspective view illustrating an example of an optical module according to the third embodiment. FIG. 20 is a cross-sectional view illustrating the example of the optical module according to the third embodiment. In FIGS. 19 and 20, portions similar to those illustrated in FIGS. 17 and 18 will be denoted by the same reference numerals, and description thereof will be omitted.

For example, when the ferrule 119 is brought close to the silicon photonics chip 120 in a state illustrated in FIGS. 17 and 18, as illustrated in FIGS. 19 and 20, the ferrule 119 and the silicon photonics chip 120 are brought into contact with each other via the adhesive 130 before curing When alignment of the ferrule 119 with respect to the silicon photonics chip 120 is performed in this state, the optical fibers 111 to 118 are optically connected to the optical connection portions 121 to 128 of the silicon photonics chip 120, respectively. Therefore, the optical device 400 including the ferrule 119 and the silicon photonics chip 120 is realized.

In addition, a portion of the adhesive 130 before curing which protrudes from the lower surface 119a and reaches the constriction portion 1701 is dispersed in parallel with the lower surface 119a in the constriction portion 1701 by moving through the constriction portion 1701 due to a capillary phenomenon. Therefore, a fillet 1901 is formed between the side of the constriction portion 1701 on the lower surface 119a side and the surface of the silicon photonics chip 120 on the ferrule 119 side. The fillet 1901 is a portion of the adhesive 130 which protrudes from the lower surface 119a of the ferrule 119 and rises on the side surface of the ferrule 119 by a capillary phenomenon.

In addition, the constriction portion 1701 is provided in parallel with the lower surface 119a as described above. Thus, when the ferrule 119 is positioned with respect to the silicon photonics chip 120 with high accuracy, a height 1902 of the fillet 1901 which is formed along the outer periphery of the ferrule 119 may be consistent.

Therefore, since the amount of the adhesive 130 before curing which protrudes from the lower surface 119a may be consistent in respective directions, even if the curing shrinkage of the adhesive 130 occurs, the force with which the ferrule 119 is pulled by the surrounding fillet 1901 is uniform. Therefore, it is possible to suppress the ferrule 119 from moving in parallel with the lower surface 119a and to suppress the positional deviation of the ferrule 119 with respect to the silicon photonics chip 120.

In addition, since the adhesive 130 enters the constriction portion 1701, it is possible to increase the contact area between the ferrule 119 and the adhesive 130 and to enhance the bonding strength between the ferrule 119 and the adhesive 130.

Figure 21:
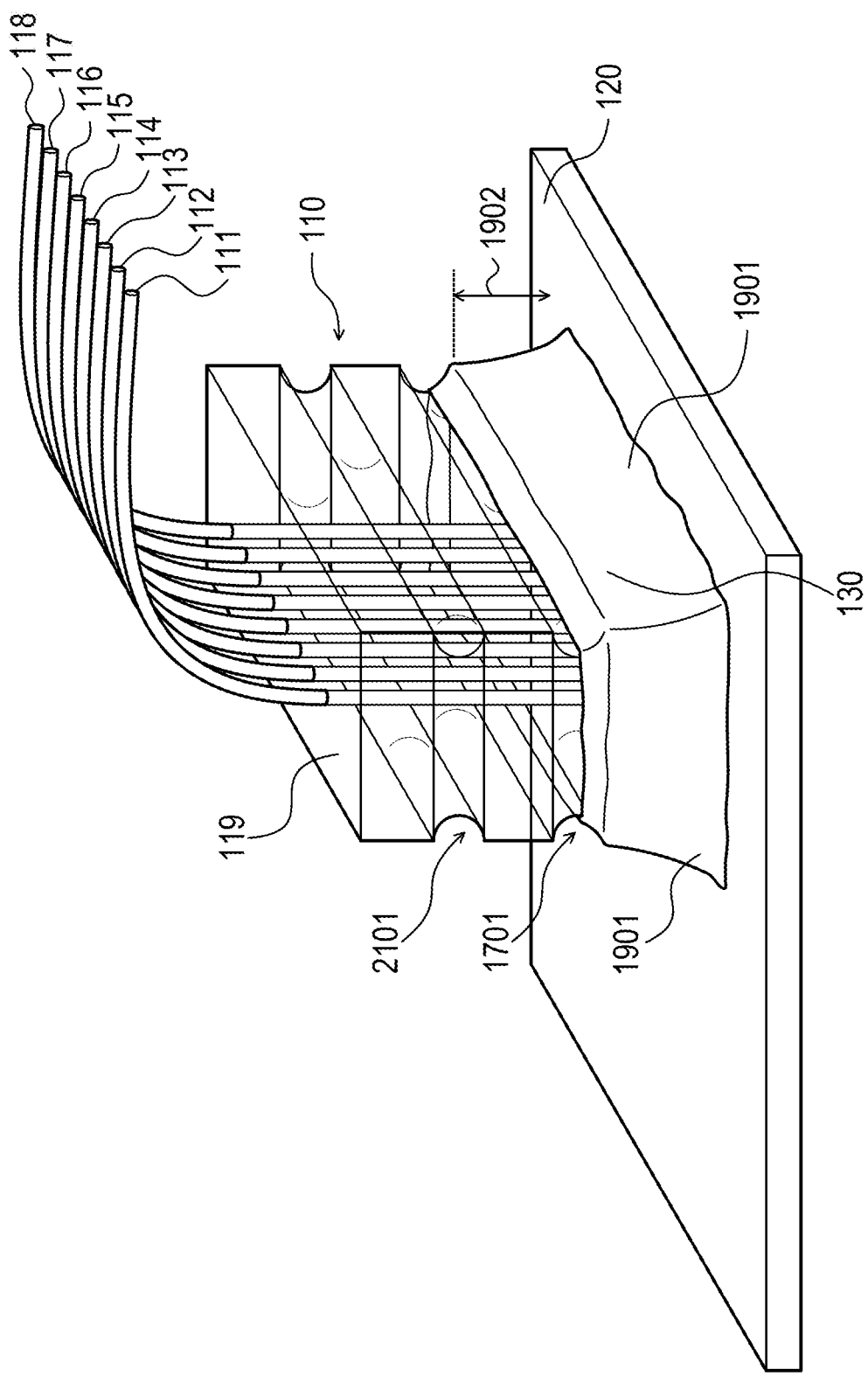
FIG. 21 is a perspective view illustrating another example of the optical module according to the third embodiment.
Figure 22:
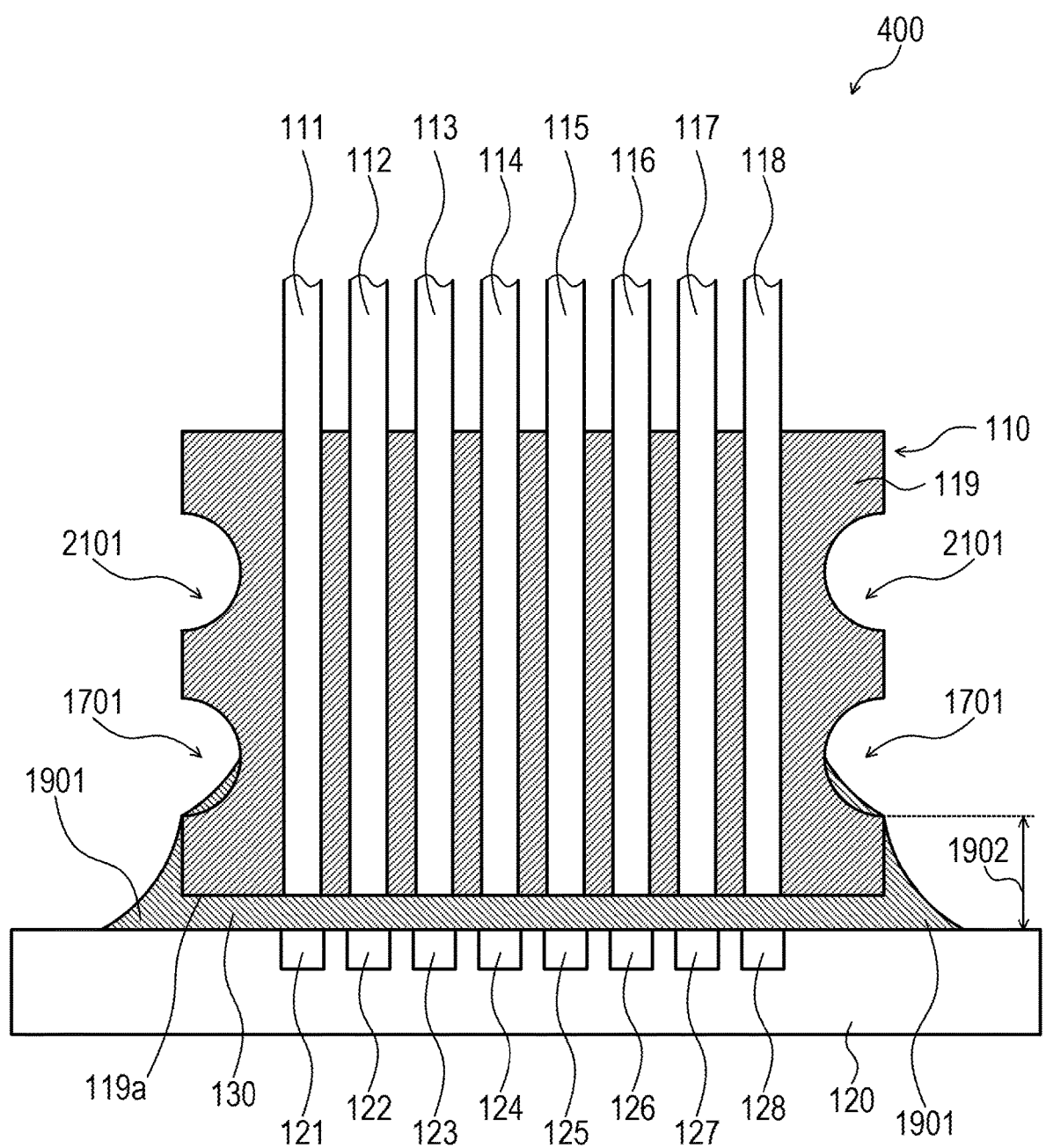
FIG. 22 is a cross-sectional view illustrating the other example of the optical module according to the third embodiment.

FIG. 21 is a perspective view illustrating another example of the optical module according to the third embodiment. FIG. 22 is a cross-sectional view illustrating the other example of the optical module according to the third embodiment. In FIGS. 21 and 22, portions similar to those illustrated in FIGS. 19 and 20 will be denoted by the same reference numerals, and a description thereof will be omitted.

As illustrated in FIGS. 21 and 22, the ferrule 119 according to the third embodiment may have a constriction portion 2101 in addition to the constriction portion 1701 illustrated in FIGS. 19 and 20. Similarly to the constriction portion 1701, the constriction portion 2101 is formed on the side surface of the ferrule 119 and is parallel to the lower surface 119*a*. In addition, the constriction portion 2101 is formed at a position farther from the lower surface 119*a* than the constriction portion 1701.

By forming the constriction portion 2101, when the constriction portion 1701 has failed to absorb the adhesive 130 before curing, the adhesive 130 which has not been absorbed may be absorbed by the constriction portion 2101. Therefore, it is possible to make the height 1902 of the fillet 1901 be consistent at the height of the constriction portion 2101. In this manner, the ferrule 119 may have a multi-stage constriction portion on the side surface thereof so as to be parallel to the lower surface 119*a*. In addition, the constriction portion of the ferrule 119 may be formed in three or more stages.

Figure 23:
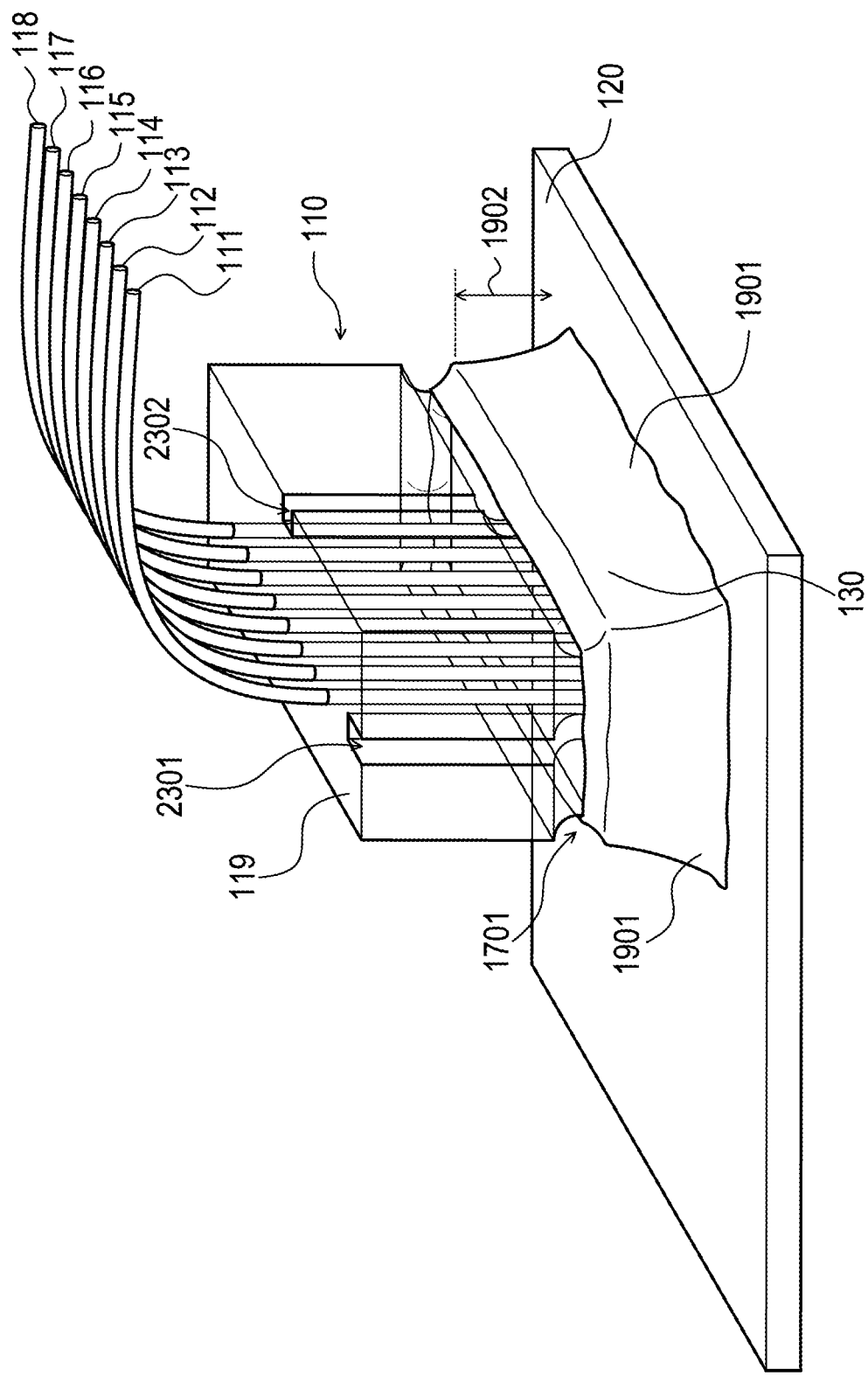
FIG. 23 is a perspective view illustrating still another example of the optical module according to the third embodiment.

FIG. 23 is a perspective view illustrating still another example of the optical module according to the third embodiment. In FIG. 23, portions similar to those illustrated in FIGS. 19 and 20 will be denoted by the same reference numerals, and a description thereof will be omitted. As illustrated in FIG. 23, the ferrule 119 according to the third embodiment may have grooves 2301 and 2302 which are formed from the constriction portion 1701 illustrated in FIGS. 19 and 20 toward the upper surface (opposite to the lower surface 119*a*) of the ferrule 119. In the example illustrated in FIG. 23, the grooves 2301 and 2302 are formed so as to reach the upper surface of the ferrule 119.

Each of the grooves 2301 and 2302 has a width at which the groove absorbs the adhesive 130 before curing by a capillary phenomenon, similarly to the above-described groove 119*b*, and is, for example, about 10 µm to 100 µm. However, the width of the grooves 2301 and 2302 is not limited to 10 µm to 100 µm, but is set such that the above-described capillary phenomenon occurs according to the material of the ferrule 119, the material of the adhesive 130, or the coating amount of the adhesive 130.

By forming the grooves 2301 and 2302, when the constriction portion 1701 has failed to absorb the adhesive 130 before curing, the adhesive 130 which has not been absorbed may be absorbed by the grooves 2301 and 2302, and the height 1902 of the fillet 1901 may be made constant.

In FIG. 23, a configuration in which the grooves 2301 and 2302 are formed in the ferrule 119 has been described, but, for example, the number, position, size, and direction of grooves formed from the constriction portion 1701 of the ferrule 119 toward the upper surface of the ferrule 119 are not limited thereto. In addition, for example, in a configuration illustrated in FIGS. 21 and 22, the grooves 2301 and 2302 may be formed from the constriction portion 2101 toward the upper surface of the ferrule 119.

Formation of the constriction portions 1701 and 2101 or the grooves 2301 and 2302 in the ferrule 119 may be performed by, for example, etching or cutting. Alternatively, when forming the ferrule 119 via combination of a plurality of parts, each part may be manufactured so that the constriction portions 1701 and 2101 or the grooves 2301 and 2302 are formed after the combination.

As described above, a holding member according to the third embodiment is formed with a constriction portion. The constriction portion is formed on a second surface of the holding member (the surface which is perpendicular to a first surface of the holding member where the end portion of an optical fiber is exposed, the first surface being bonded to a semiconductor substrate), and is parallel to the first surface. Therefore, it is possible to make the amount of the adhesive before curing which protrudes from the holding member be consistent in respective directions and to suppress the position of the holding member from deviating due to the curing shrinkage of the protruding adhesive. Therefore, it is possible to suppress the positional deviation of the holding member with respect to the semiconductor substrate due to the curing shrinkage of the adhesive.

For example, the ferrule 119 according to the third embodiment is formed with the constriction portion 1701. The constriction portion 1701 is formed on the side surface of the ferrule 119 and is parallel to the lower surface 119*a*. Therefore, it is possible to make the amount of the adhesive 130 before curing which protrudes from the ferrule 119 be consistent in respective directions and to suppress the position of the ferrule 119 from deviating due to the curing shrinkage of the protruding adhesive 130. Therefore, it is possible to suppress the positional deviation of the ferrule 119 with respect to the silicon photonics chip 120 due to the curing shrinkage of the adhesive 130.

In addition, similarly to the groove 119*b* illustrated in FIG. 9, the constriction portion 1701 of the ferrule 119 may not be formed on the short surface of the ferrule 119 as viewed from the lower surface. For example, the constriction portion 1701 of the ferrule 119 is formed on the longitudinal surface of the ferrule 119 as viewed from the lower surface. Therefore, it is possible to make the amount of the adhesive 130 before curing which spreads toward the longitudinal side of the ferrule 119 from which the adhesive easily protrudes be consistent. Therefore, it is possible to efficiently suppress the amount of the adhesive 130 before curing which protrudes.

In each of the above-described embodiments, an example in which an ultraviolet curable resin that is cured by irradiation with ultraviolet rays is used as the adhesive 130 has been described, but the adhesive 130 is not limited to the ultraviolet curable resin and may use any of various adhesives. For example, for the adhesive 130, various adhesives which undergo shrinkage by curing and are transparent after curing, such as, for example, an adhesive which is cured by heating or as the time passes, may be used as the adhesive 130.

As described above, according to the holding member and the optical module, it is possible to suppress the positional deviation of the holding member due to the curing shrinkage of the adhesive.

For example, in recent years, along with an increase in the amount of data in communication, the frequency of optical communication equipment has been increased and the number of channels has been increased. Under such a circumstance, a silicon photonics chip which forms an electrical circuit and an optical waveguide on silicon similarly to a conventional semiconductor is being developed because it may realize high-speed and high-density optical communication equipment.

However, in the silicon photonics chip, an adhesive such as, for example, an ultraviolet curable resin is used when bonding an optical path, but the optical path may deviate due to the curing shrinkage of this adhesive. As a factor of this deviation, since the coating amount or the coating shape of the adhesive for bonding the silicon photonics chip to the ferrule varies, the adhesive may unevenly protrude from the ferrule and the stress generated by the curing shrinkage of the adhesive may be biased.

On the other hand, according to each of the embodiments described above, since it is possible to suppress the protrusion of the adhesive from the ferrule or to make the protrusion of the adhesive from the ferrule be uniform, it is possible to suppress the bias of the stress generated by the curing shrinkage of the adhesive. Therefore, it is possible to suppress the deviation of the optical path due to the curing shrinkage of the adhesive.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A holding member configured to hold an optical fiber of which an end connects to an optical circuit formed on a semiconductor substrate, the holding member comprising:
    a first surface configured to surround an exposed end of the held optical fiber;
    a second surface configured to be bonded to the semiconductor substrate to surround the first surface;
    a groove configured to be formed along an edge of the first surface and provided between the edge of the first surface and an edge of the second surface; and
    a hole coupled between the groove and a third surface and configured to communicate with the groove.

2. The holding member according to claim 1, wherein the groove includes a portion formed along a longitudinal side of the first surface.

3. The holding member according to claim 1, wherein the first surface and the second surface are on a same plane.

4. The holding member according to claim 1, wherein the groove absorbs an adhesive before curing which bonds the second surface to the semiconductor substrate.

5. The holding member according to claim 1, wherein the semiconductor substrate is a substrate formed by silicon photonics.

6. An optical module comprising:
    a semiconductor substrate formed with an optical circuit; and
    a holding member configured to hold an optical fiber of which an end connects to an optical circuit formed on a semiconductor substrate,
    the holding member including:
    a first surface configured to surround an exposed end of the held optical fiber,
    a second surface configured to be bonded to the semiconductor substrate to surround the first surface,
    a groove configured to be formed along an edge of the first surface and provided between the edge of the first surface and an edge of the second surface, and
    a hole coupled between the groove and a third surface and configured to communicate with the groove.

7. The holding member according to claim 6, wherein the first surface and the second surface are on a same plane.

8. The optical module according to claim 6, wherein the groove absorbs an adhesive before curing which bonds the second surface to the semiconductor substrate.

9. The holding member according to claim 1, wherein the third surface includes a side surface of the holding member that is perpendicular to the second surface, and an upper surface of the holding member that is opposite to the second surface.

* * * * *